(12) United States Patent
Tsuno et al.

(10) Patent No.: US 12,413,070 B2
(45) Date of Patent: Sep. 9, 2025

(54) DIRECT-CURRENT BUS CONTROL SYSTEM

(71) Applicant: RIKEN, Saitama (JP)

(72) Inventors: Katsuhiko Tsuno, Saitama (JP); Katsushi Fujii, Saitama (JP); Kayo Koike, Saitama (JP); Satoshi Wada, Saitama (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 18/737,050

(22) Filed: Jun. 7, 2024

(65) Prior Publication Data

US 2024/0322564 A1   Sep. 26, 2024

Related U.S. Application Data

(63) Continuation of application No. PCT/JP2022/045490, filed on Dec. 9, 2022.

(30) Foreign Application Priority Data

Dec. 10, 2021   (JP) .................. 2021-201141

(51) Int. Cl.
  *H02J 1/04*   (2006.01)
  *H02J 1/12*   (2006.01)
  *H02J 7/35*   (2006.01)
(52) U.S. Cl.
  CPC .................. *H02J 1/12* (2013.01); *H02J 1/04* (2013.01); *H02J 7/35* (2013.01); *H02J 2207/20* (2020.01);
  (Continued)
(58) Field of Classification Search
  CPC ........ H02J 1/04; H02J 1/00; H02J 1/10; H02J 1/12; H02J 7/00; H02J 7/007; H02J 7/00714; H02J 7/34; H02J 7/35
  (Continued)

(56) References Cited

U.S. PATENT DOCUMENTS 11,133,673 B2 * 9/2021 Yamashita ............. H02J 1/102
2020/0280183 A1   9/2020 Yamashita et al.

FOREIGN PATENT DOCUMENTS

| WO | 2012/057032 | 5/2012 |
| WO | 2019/103059 | 5/2019 |
| WO | 2021/200902 | 10/2021 |

OTHER PUBLICATIONS

International Search Report for PCT/JP2022/045490 mailed on Feb. 21, 2023.

* cited by examiner

*Primary Examiner* — Hai L Nguyen
(74) *Attorney, Agent, or Firm* — IPUSA, PLLC

(57) ABSTRACT

A direct-current bus control system is provided for controlling power variation in a DC bus connecting an input power source and a load, including: a main stabilizer including a first charge/discharge element and a first power converter; and a plurality of sub-stabilizers each including a second charge/discharge element, a charge element, or a discharge element, and a second power converter. The plurality of sub-stabilizers include a first sub-stabilizer and a second sub-stabilizer including the charge element. When the voltage of the DC bus is higher than a first charge threshold, the second power converter of the first sub-stabilizer supplies a current equal to a current target value obtained by the second power converter of the first sub-stabilizer from the DC bus to the charge element of the first sub-stabilizer.

10 Claims, 15 Drawing Sheets

(52) U.S. Cl.
CPC ....... *H02J 2300/24* (2020.01); *H02J 2300/28* (2020.01); *H02J 2300/30* (2020.01)

(58) Field of Classification Search
USPC .......................................... 307/44, 45, 46, 82
See application file for complete search history.

DIRECT-CURRENT BUS CONTROL SYSTEM

CROSS-REFERENCE TO RELATED APPLICATIONS

This application is a continuation application of International Application No. PCT/JP2022/045490, filed on Dec. 9, 2022, and designating the U.S., which is based upon and claims priority to Japanese Patent Application No. 2021-201141, filed on Dec. 10, 2021, the entire contents of which are incorporated herein by reference.

BACKGROUND

Technical Field

The present disclosure relates to a Direct-Current (DC) bus control system.

Background Art

Recently, as alternative power sources to replace fossil energy and nuclear energy, power source systems utilizing renewable energy such as solar light, wind force, wave force, and the like have been attracting attention. Some power source systems utilizing renewable energy such as solar light, wind force, wave force, and the like have already been put into practical use.

Power generated by power source systems utilizing renewable energy such as solar light, wind force, wave force, and the like greatly varies depending on weather, season, location, and the like. Therefore, in order to maintain the voltage of the DC bus to which the power source system is connected within a predetermined allowable range, it is desirable to connect a power source such as a solar cell or a wind-force power generator to the DC bus via a power converter having a wide input range and a large capacity. However, in the case of connection to the DC bus via a power converter having a large capacity, the large capacity of the power converter may increase the size, complexity, and cost of the entire system.

International Publication No. WO 2019/103059 discloses a DC bus control system configured to efficiently control power variation in the DC bus caused due to variations in the input power source and the load.

SUMMARY

In the DC bus control system disclosed in International Publication No. WO 2019/103059, it is desirable that a sub-stabilizer is charged or discharged efficiently in order to bring efficiency to power variation in the DC bus.

The present disclosure provides a direct-current bus control system for bringing efficiency to charging from the DC bus or discharging to the DC bus.

The present disclosure is a direct-current bus control system for controlling power variation in a DC bus connecting an input power source and a load, the direct-current bus control system including:
  a main stabilizer including a first charge/discharge element and a first power converter; and
  a plurality of sub-stabilizers each including a second charge/discharge element, a charge element, or a discharge element, and a second power converter,
  wherein the first power converter is configured to obtain a bus voltage target value corresponding to a power storage quantity index of the first charge/discharge element, and to cause the first charge/discharge element and the DC bus to bidirectionally transmit or receive a DC power to or from each other such that a voltage of the DC bus becomes equal to the bus voltage target value,
  the second power converter is configured to obtain a current target value in accordance with a difference between the voltage of the DC bus and a threshold regarding charging or discharging of the second charge/discharge element, the charge element, or the discharge element, and to cause the second charge/discharge element, the charge element, or the discharge element, and the DC bus to transmit or receive a DC power to or from each other such that a current equal to the current target value flows through the second charge/discharge element, the charge element, or the discharge element,
  the plurality of sub-stabilizers include a first sub-stabilizer and a second sub-stabilizer including the charge element,
  the second power converter of the first sub-stabilizer is configured to supply the current equal to the current target value obtained by the second power converter of the first sub-stabilizer from the DC bus to the charge element of the first sub-stabilizer when the voltage of the DC bus is higher than a first charge threshold, and
  the second power converter of the second sub-stabilizer is configured to stop supplying a current from the DC bus to the charge element of the second sub-stabilizer or to supply a constant current from the DC bus to the charge element of the second sub-stabilizer regardless of the voltage of the DC bus when the voltage of the DC bus is higher than the first charge threshold and lower than a second charge threshold that is higher than the first charge threshold, and to supply the current equal to the current target value obtained by the second power converter of the second sub-stabilizer from the DC bus to the charge element of the second sub-stabilizer when the voltage of the DC bus is higher than the second charge threshold.

The direct-current bus control system according to the present disclosure can bring efficiency to charging from the DC bus or discharging to the DC bus.

DETAILED DESCRIPTION OF THE INVENTION

Hereinafter, a Direct-Current (DC) bus control system according to the present embodiment will be described in detail with reference to the drawings. The contents of International Publication No. WO 2019/103059 are hereby incorporated in its entirety by reference.

Figure 1:
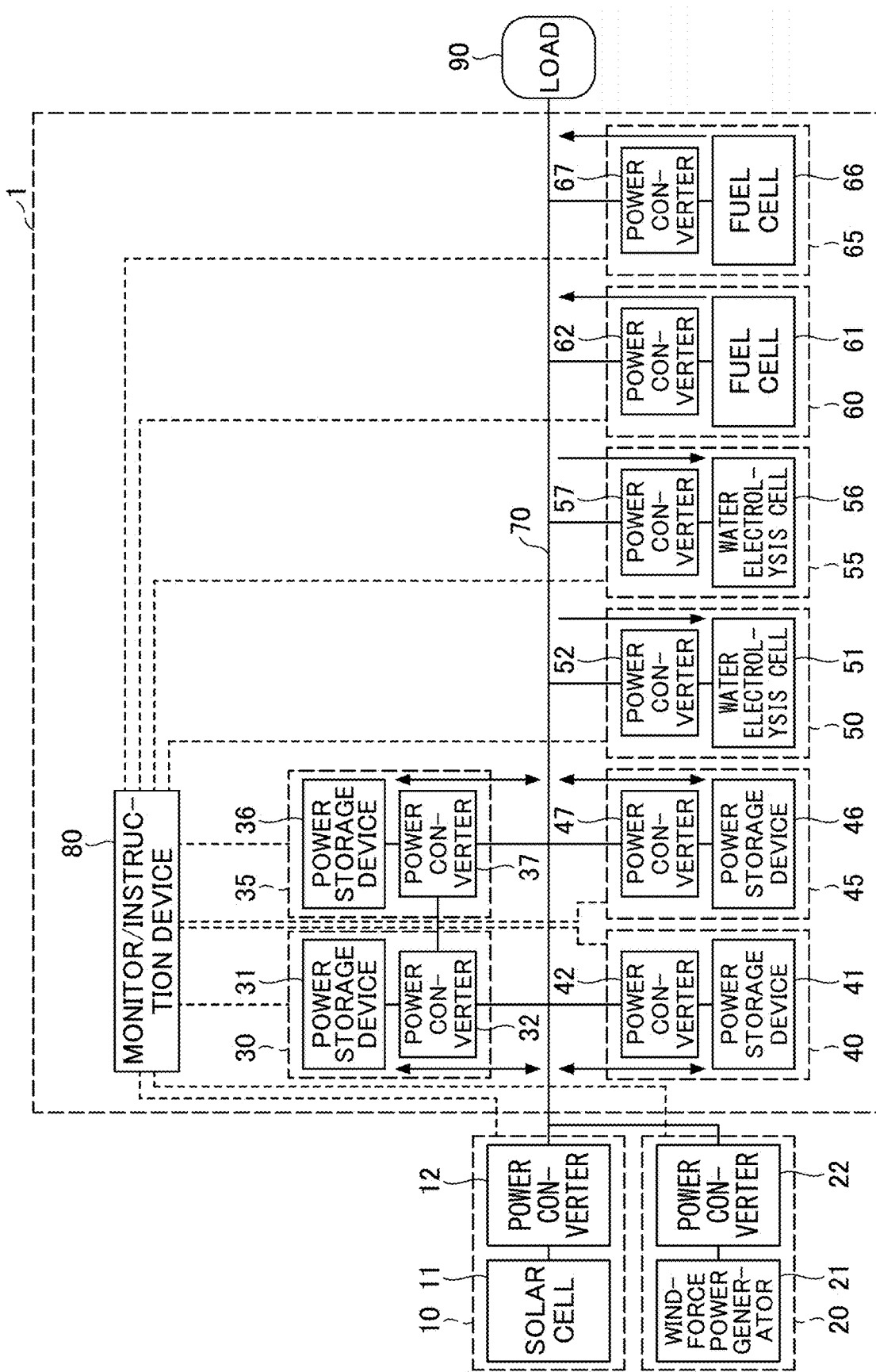
FIG. 1 is a configuration diagram of the entirety of a Direct-Current (DC) bus control system according to the present embodiment.

FIG. 1 is a configuration diagram of the entirety of a Direct-Current (DC) bus control system 1 according to the present embodiment. The DC bus control system 1 controls power variation in a DC bus connecting an input power source and a load. A solar power generation system 10 and a wind-force power generation system 20, which are renewable energy power source systems, are connected to the DC bus control system 1 as input power sources. The solar power generation system 10 and the wind-force power generation system 20 are connected in parallel to a DC bus 70 of the DC bus control system 1. The solar power generation system 10 includes a solar cell 11 and a power converter 12. The wind-force power generation system 20 includes a wind-force power generator 21 and a power converter 22.

The input power source connected to the DC bus control system 1 may be any desirably selected power source. In a case where the input power source is a renewable energy power source system, it may be not only the power source system described above, but also a power source system utilizing such energy as wave force or geothermal heat, and may be a power source system for hydraulic (low head hydraulic) power generation, tidal power generation, tidal current power generation, temperature-difference power generation, and the like. It may also be a combination of the power source systems described above. Furthermore, the number of power source systems connected in parallel with each other is not particularly limited.

A load 90 is connected to the output of the DC bus control system 1. The load 90 includes, for example, household or business equipment, devices, and the like. The load 90 also includes a parallel arrangement of a plurality of household or business equipment, devices, and the like. The load 90 may be a DC load such as a DC electric motor, or a Direct Current/Alternate Current (DC/AC) converter configured to convert a DC power into an AC power and its AC load. Moreover, as the load 90, an AC power system may be connected to the DC bus 70 via a DC/AC converter.

The DC bus control system 1 may include an input power source or may include a load. The DC bus control system 1 may include both an input power source and a load.

The DC bus control system 1 includes a main stabilizer 30 and an auxiliary device 35 that assists the main stabilizer 30. The DC bus control system 1 also includes a sub-stabilizer 40 and a sub-stabilizer 45 having the same configuration as that of the sub-stabilizer 40. Further, the DC bus control system 1 includes a sub-stabilizer 50 and a sub-stabilizer 55 having the same configuration as that of the sub-stabilizer 50, and a sub-stabilizer 60 and a sub-stabilizer 65 having the same configuration as that of the sub-stabilizer 60. Further, the DC bus control system 1 includes a monitor/instruction device 80.

Each of the main stabilizer 30, the auxiliary device 35, the sub-stabilizer 40, the sub-stabilizer 45, the sub-stabilizer 50, the sub-stabilizer 55, the sub-stabilizer 60, and the sub-stabilizer 65 is connected to the DC bus 70.

The main stabilizer 30 includes a power storage device 31 and a power converter 32. The main stabilizer 30 sets a variable bus voltage target value within a predetermined allowable range centered on a reference bus voltage (i.e., the reference voltage of the DC bus 70), operates the power converter 32 such that an output voltage to the DC bus 70 side becomes equal to the bus voltage target value, and controls the charge/discharge of the power storage device 31.

The auxiliary device 35 includes a power storage device 36 and a power converter 37. The auxiliary device 35 charges or discharges the power storage device 36 with or by a current having a current value corresponding to the current value of a current that is charged in or discharged from the main stabilizer 30. The power converter 37 of the auxiliary device 35 controls charge or discharge of the power storage device 36 by operating the power storage device 36 to flow a current having a current value corresponding to the current value of the current with or by which the power converter 32 charges or discharges the power storage device 31. The auxiliary device 35 apparently amplifies the power that is charged in or discharged from the main stabilizer 30 by charging or discharging the power storage device 36 based on the charge or discharge current of the main stabilizer 30.

The sub-stabilizer 40 includes a power storage device 41 and a power converter 42. The sub-stabilizer 45 includes a power storage device 46 and a power converter 47. The sub-stabilizer 45 has the same configuration as that of the sub-stabilizer 40. That is, the power storage device 46 has the same specifications as those of the power storage device 41. The power converter 47 has the same specifications as those of the power converter 42. Although the sub-stabilizer 45 will be described here as having the same configuration as that of the sub-stabilizer 40, the sub-stabilizer 45 is not limited to having the same configuration as that of the sub-stabilizer 40. For example, the sub-stabilizer 45 needs only to include a charge/discharge element as does the sub-stabilizer 40.

The sub-stabilizer 40 calculates an input/output current target value based on the difference between a charge/discharge threshold and the voltage of the DC bus 70, and operates its own power converter 42 such that an input/output current becomes equal to the input/output current target value, to control the charge/discharge of the power storage device 41. The sub-stabilizer 45 calculates an input/output current target value based on the difference between a charge/discharge threshold and the voltage of the DC bus, and operates the power converter 47 such that an input/ output current becomes equal to the input/output current target value, to control the charge/discharge of the power storage device 46.

Each of the power storage device 31, the power storage device 36, the power storage device 41, and the power storage device 46 is, for example, a battery (secondary battery), an electric double layer capacitor, a capacitor, a flywheel, a redox flow battery, or the like. Each of the power converter 32, the power converter 37, the power converter 42, and the power converter 47 is, for example, an insulated DC/DC converter or a chopper, and is capable of transmitting or receiving a DC power bidirectionally as indicated by the arrows in FIG. 1.

The sub-stabilizer 50 includes a water electrolysis cell 51 and a power converter 52. The sub-stabilizer 55 includes a water electrolysis cell 56 and a power converter 57. The sub-stabilizer 55 has the same configuration as that of the sub-stabilizer 50. That is, the water electrolysis cell 56 has the same specifications as those of the water electrolysis cell 51. The power converter 57 has the same specifications as those of the power converter 52. Although the sub-stabilizer 55 will be described here as having the same configuration as that of the sub-stabilizer 50, the sub-stabilizer 55 is not limited to having the same configuration as that of the sub-stabilizer 50. For example, the sub-stabilizer 55 needs only to include a charge element as does the sub-stabilizer 50.

In the sub-stabilizer 50, the power converter 52 performs DC/DC conversion such that an input current becomes equal to an input current target value calculated based on the difference between a charge threshold and the voltage of the DC bus 70 and a DC power is supplied to the water electrolysis cell 51 (this is a type of a charging operation). The water electrolysis cell 51 electrolyzes water to produce hydrogen gas and oxygen gas. Similarly, in the sub-stabilizer 55, the power converter 57 performs DC/DC conversion such that an input current becomes equal to an input current target value calculated based on the difference between a charge threshold and the voltage of the DC bus 70 and a DC power is supplied to the water electrolysis cell 56 (a type of a charging operation). The water electrolysis cell 56 electrolyzes water to produce hydrogen gas and oxygen gas.

The sub-stabilizer 60 includes a fuel cell 61 and a power converter 62. The sub-stabilizer 65 includes a fuel cell 66 and a power converter 67. The sub-stabilizer 65 has the same configuration as that of the sub-stabilizer 60. That is, the fuel cell 66 has the same specifications as those of the fuel cell 61. The power converter 67 has the same specifications as those of the power converter 62. Although the sub-stabilizer 65 will be described here as having the same configuration as that of the sub-stabilizer 60, the sub-stabilizer 65 is not limited to having the same configuration as that of the sub-stabilizer 60. For example, the sub-stabilizer 65 needs only to include a discharge element as does the sub-stabilizer 60.

The sub-stabilizer 60 supplies a DC power generated by an electrochemical reaction of the fuel cell 61 to the DC bus 70 via the power converter 62 (this is a type of a discharge operation). In the sub-stabilizer 60, the power converter 62 performs DC/DC conversion such that an output current becomes equal to an output current target value calculated based on the difference between a discharge threshold and the voltage of the DC bus 70. Similarly, the sub-stabilizer 65 supplies a DC power generated by an electrochemical reaction of the fuel cell 66 to the DC bus 70 via the power converter 67 (a type of discharge operation). In the sub-stabilizer 65, the power converter 67 performs DC/DC conversion such that an output current becomes equal to an output current target value calculated based on the difference between a discharge threshold and the voltage of the DC bus 70.

The configurations of the sub-stabilizer 50 and the sub-stabilizer 60 described above are merely exemplary. An alternative to the water electrolysis cell 51 may be, for example, a means for electrochemically reducing carbon dioxide to produce C—H-based bonds ($CH_4$, $C_2H_4$, and the like.) or alcohols, or a means for reducing nitrogen to produce ammonia. An alternative to the fuel cell 61 may be, for example, a fuel cell utilizing alcohols or the like, or a means for generating electricity by burning a chemical substance (hydrogen, C—H bases, alcohols, ammonia, and the like) to rotate a turbine or the like. The same applies to the sub-stabilizer 55 and the sub-stabilizer 65.

Figure 2:
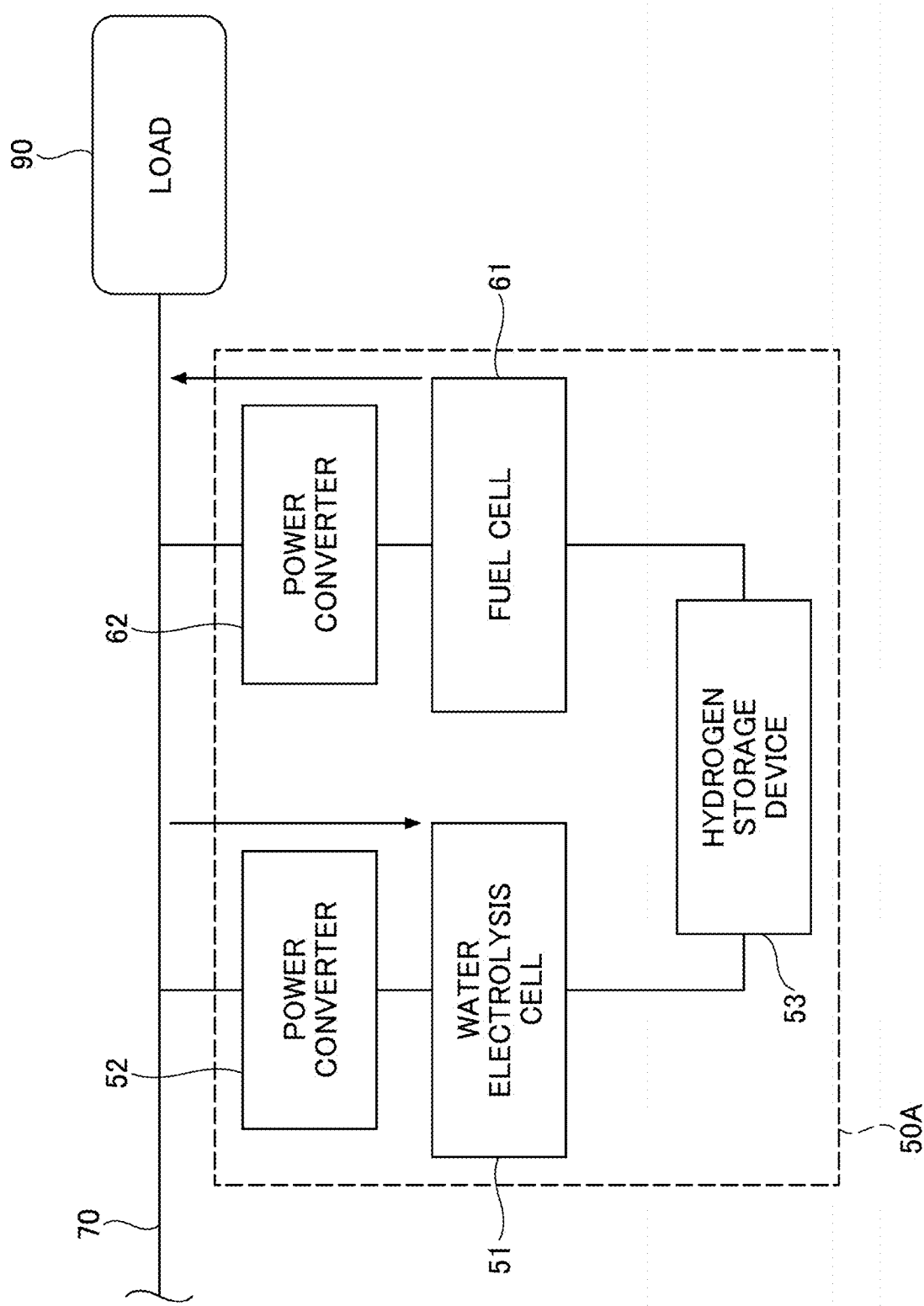
FIG. 2 is a configuration diagram illustrating another example of a sub-stabilizer of a DC bus control system according to the present embodiment.

FIG. 2 is a configuration diagram illustrating a sub-stabilizer 50A, which is another example of the sub-stabilizer of the DC bus control system 1 according to the present embodiment. The sub-stabilizer 50A includes a power converter 52 and a power converter 62, a water electrolysis cell 51, a fuel cell 61, and a hydrogen storage device 53. The sub-stabilizer 50A has an integrated structure in which the sub-stabilizer 50 and the sub-stabilizer 60 described above share the hydrogen storage device 53.

In FIG. 1, each of the power storage device 31, the power storage device 36, the power storage device 41, and the power storage device 46 is capable of absorbing (being charged with) and discharging (releasing) a DC power. Each of the water electrolysis cell 51 and the water electrolysis cell 56 can convert a DC power into a gas and store it to absorb (be charged with) the DC power. Each of the fuel cell 61 and the fuel cell 66 can generate power by converting a gas into a DC power. The hydrogen storage device 53 illustrated in FIG. 2 can also absorb (be charged with) and discharge (release) a DC power by storing a gas. The power storage device 36, the power storage device 41, and the power storage device 46 each constitute a charge/discharge element. The water electrolysis cell 51 and the water electrolysis cell 56 each constitute a charge element. The fuel cell 61 and the fuel cell 66 each constitute a discharge element. The hydrogen storage device 53 constitutes a charge/discharge element.

Each stabilizer (each of the main stabilizer 30, the auxiliary device 35, the sub-stabilizer 40, the sub-stabilizer 45, the sub-stabilizer 50, the sub-stabilizer 55, the sub-stabilizer 60, and the sub-stabilizer 65) serves as a power buffer that transmits or receives a DC power to or from the DC bus 70. Each of the main stabilizer 30, the auxiliary device 35, the sub-stabilizer 40, and the sub-stabilizer 45 is a power buffer having a charge/discharge function. Each of the sub-stabilizer 50 and the sub-stabilizer 55 is a power buffer having a charge function. Each of the sub-stabilizer 60 and the sub-stabilizer 65 is a power buffer having a discharge function.

It is desirable that there is only one main stabilizer 30 that has a function for setting the bus voltage target value. It is only necessary to provide a required number of sub-stabilizers in accordance with the number of parallel power source systems and the required power of the load 90.

The monitor/instruction device 80 collects state information regarding a state of each of the main stabilizer 30, the auxiliary device 35, the sub-stabilizer 40, the sub-stabilizer 45, the sub-stabilizer 50, the sub-stabilizer 55, the sub-stabilizer 60, and the sub-stabilizer 65 (hereinafter referred to as "main stabilizer and the like"), and performs state monitoring and operation monitoring. The state information includes, for example, voltage, current, temperature, and the like. Further, the monitor/instruction device 80 generates an operation command and a charge/discharge threshold command based on the result of monitoring the main stabilizer and the like. Wired or wireless transmission/reception is possible between the monitor/instruction device 80 and the main stabilizer and the like.

Next, the configuration of each part of the DC bus control system 1 according to the present embodiment will be described. The solar power generation system 10 and the wind-force power generation system 20 are connected as input power sources to the DC bus control system 1 according to the present embodiment.

The solar power generation system 10 and the wind-force power generation system 20 have a common function in that they convert power generated using renewable energy into a DC power via the power converter 12 and the power converter 22, respectively, and supply it to the DC bus 70. In the following description, the solar power generation system 10 will be described as an example, and description of the wind-force power generation system 20 will be omitted.

Figure 3:
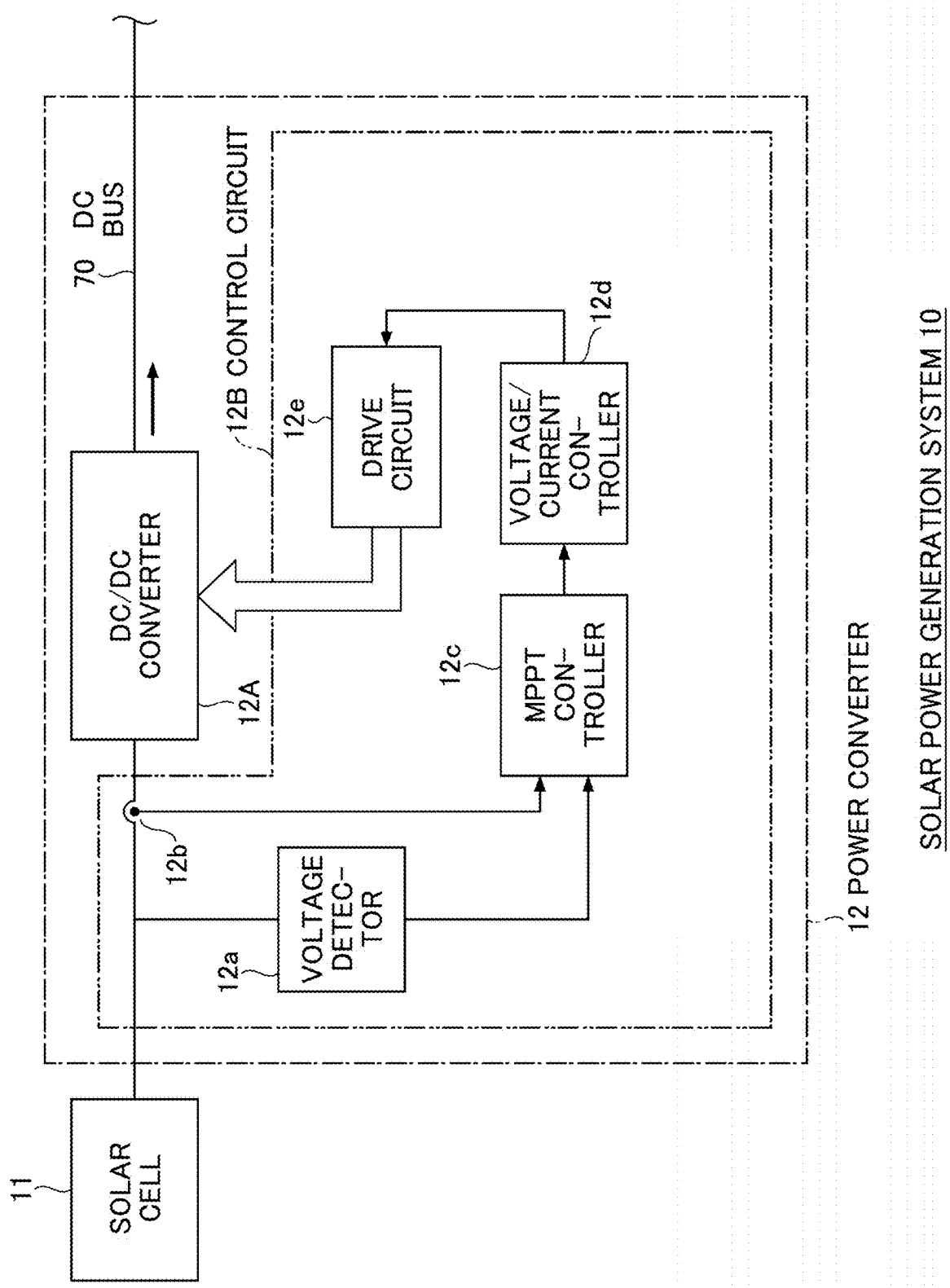
FIG. 3 is a block diagram illustrating an example of a configuration of a power converter of a solar power generation system.

FIG. 3 is a block diagram illustrating a configuration example of the power converter 12 of the solar power generation system 10. The power converter 12 includes a DC/DC converter 12A and a control circuit 12B.

The DC/DC converter 12A converts a DC output voltage of the solar cell 11 into a DC voltage of a predetermined magnitude through an operation of a semiconductor switching element and outputs it to the DC bus 70. Part of the DC/DC converter 12A is constituted by, for example, a step-up chopper.

The control circuit 12B controls the DC/DC converter 12A. The control circuit 12B includes a voltage detector 12a, a current detector 12b, an MPPT controller 12c, a voltage/current controller 12d, and a drive circuit 12e. The voltage detector 12a detects the output voltage of the solar cell 11. The current detector 12b detects the output current of the solar cell 11.

The MPPT controller 12c performs maximum power point tracking (MPPT). The output voltage of the solar cell 11 detected by the voltage detector 12a and the output current of the solar cell 11 detected by the current detector 12b are input into the MPPT controller 12c. The MPPT controller 12c searches for the maximum output point of the solar cell 11 by a hill-climbing method or the like and outputs the result to the voltage/current controller 12d.

The voltage/current controller 12d generates a drive pulse by Pulse Width Modulation (PWM) control or the like based on the input from the MPPT controller 12c. The voltage/current controller 12d outputs the generated drive pulse to the drive circuit 12e. The drive circuit 12e turns ON or OFF the semiconductor switching element of the DC/DC converter 12A based on the drive pulse that is output from the voltage/current controller 12d.

Figure 4:
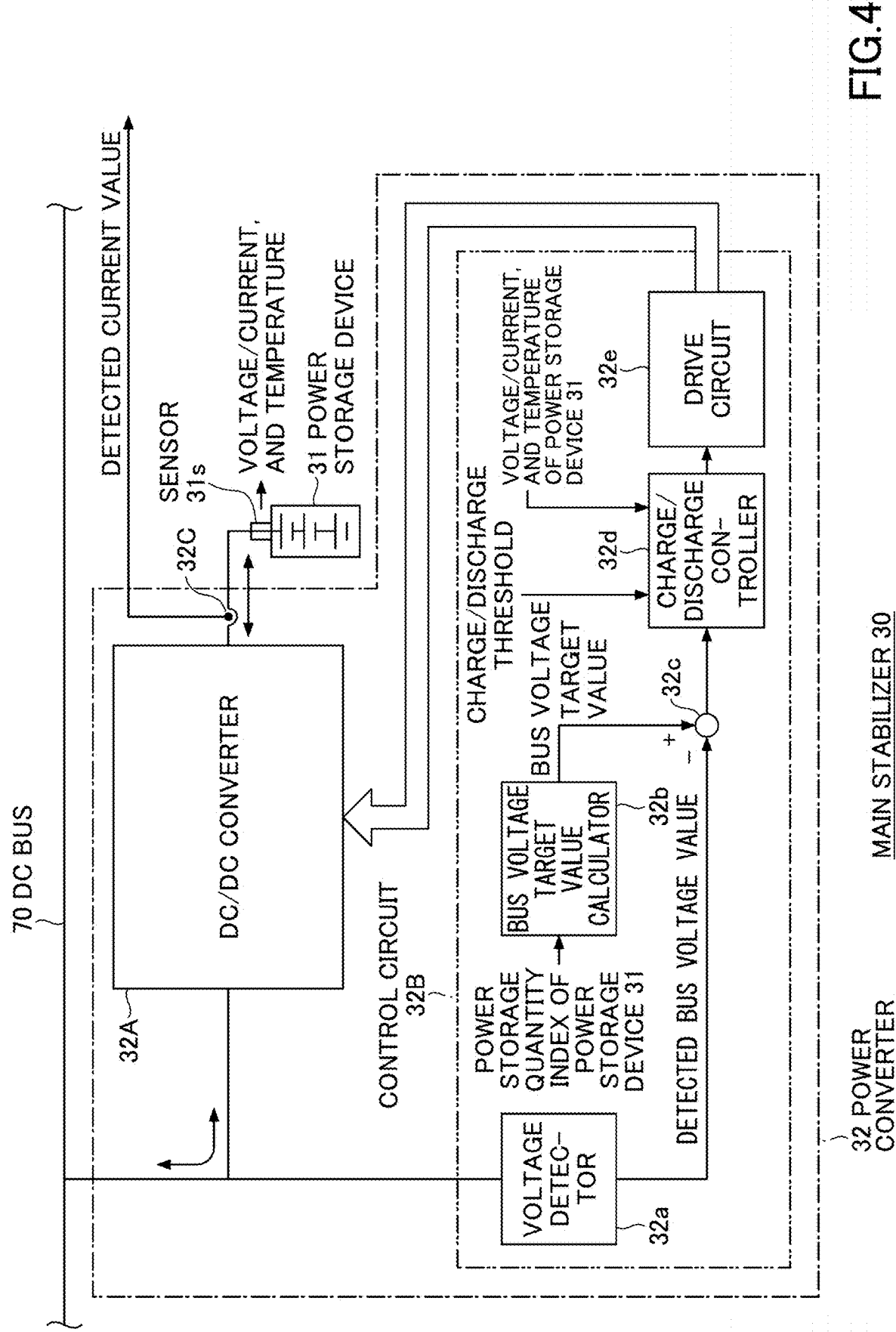
FIG. 4 is a block diagram illustrating an example of a configuration of a power converter of a main stabilizer.

FIG. 4 is a block diagram illustrating a configuration example of the power converter 32 of the main stabilizer 30. The power converter 32 includes a DC/DC converter 32A, a control circuit 32B, and a current detector 32C.

The DC/DC converter 32A has a function of causing the DC bus 70 and the power storage device 31 to bidirectionally transmit or receive a DC power to or from each other to control charge or discharge of the power storage device 31. Part of the DC/DC converter 32A is constituted by an insulated DC/DC converter, a chopper, or the like including a semiconductor switching element. The power storage device 31 includes a sensor 31s configured to detect voltage/current, and temperature.

The control circuit 32B includes a voltage detector 32a, a bus voltage target value calculator 32b, a subtractor 32c, a charge/discharge controller 32d, and a drive circuit 32e.

The voltage detector 32a detects the voltage of the DC bus 70. The bus voltage target value calculator 32b calculates a bus voltage target value in accordance with a power storage quantity index of the power storage device 31. For example, the bus voltage target value is calculated based on: an estimated power storage quantity index that is obtained by measuring a charge/discharge current of the power storage device 31; a reference power storage quantity index; and a reference bus voltage. For example, the bus voltage target value is set to be higher as the power storage quantity index (e.g., a charge rate) is higher and to be lower as the power storage quantity index is lower within an allowable range of the voltage of the DC bus 70.

As the power storage quantity index of the power storage device 31, for example, a charge rate (State of Charge (SOC)) obtained by integrating the charge/discharge current of the power storage device 31 detected by the sensor 31s can be used.

The subtractor 32c calculates the deviation between the bus voltage target value and a detected bus voltage value. The subtractor 32c outputs the calculated deviation to the charge/discharge controller 32d.

The charge/discharge controller 32d performs PWM control or the like to generate a drive pulse such that a detected bus voltage value becomes equal to the bus voltage target value. A voltage/current, a temperature, and a charge/discharge threshold of the power storage device 31 are input into the charge/discharge controller 32d. Based on the input information of the power storage device 31 such as voltage/current, temperature, and charge/discharge threshold, the charge/discharge controller 32d performs PWM control or the like to generate a drive pulse such that a detected bus voltage value becomes equal to the bus voltage target value.

The drive circuit 32e turns ON and OFF the semiconductor switching element of the DC/DC converter 32A in accordance with the drive pulse generated by the charge/discharge controller 32d. As described above, the DC/DC converter 32A controls the charge/discharge of the power storage device 31 such that a detected bus voltage value becomes equal to the bus voltage target value.

The current detector 32C detects the current value of the current with or by which the power storage device 31 is charged or discharged. The current detector 32C outputs the current value thus detected (detected current value) to the power converter 37 of the auxiliary device 35.

The charge/discharge threshold of the power storage device 31 may be set by the control circuit 32B itself or received as a command from the monitor/instruction device 80.

Figure 5:
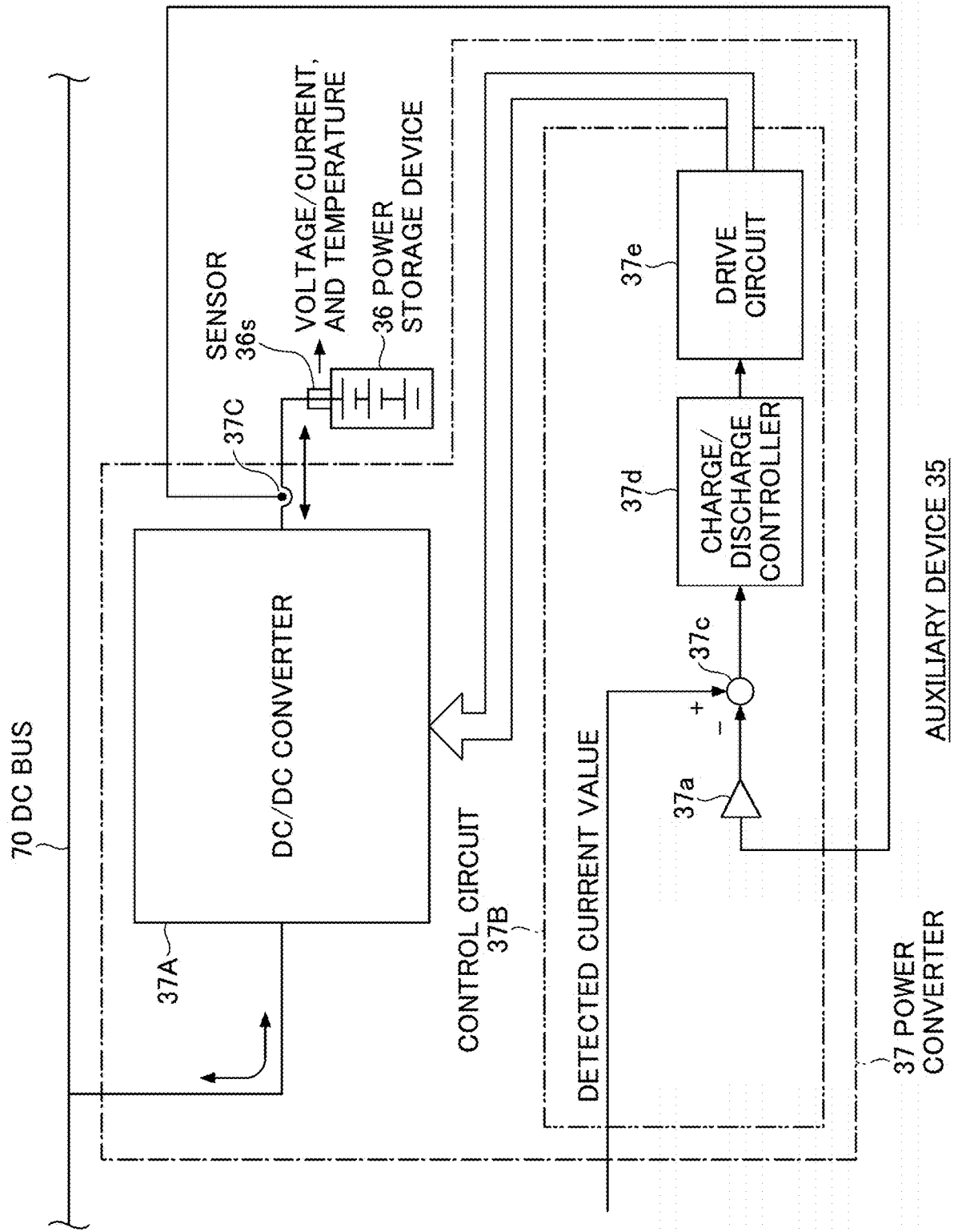
FIG. 5 is a block diagram illustrating an example of a configuration of a power converter of an auxiliary device.

FIG. 5 is a block diagram illustrating a configuration example of the power converter 37 of the auxiliary device 35. The power converter 37 includes a DC/DC converter 37A, a control circuit 37B, and a current detector 37C.

The DC/DC converter 37A has a function of causing the DC bus 70 and the power storage device 36 to bidirectionally transmit or receive a DC power to and from each other to control charge or discharge of the power storage device 36. Part of the DC/DC converter 37A is constituted by an insulated DC/DC converter, a chopper, or the like including a semiconductor switching element. The power storage device 36 includes a sensor 36s configured to detect voltage/current, and temperature.

The control circuit 37B includes an amplifier 37a, a subtractor 37c, a charge/discharge controller 37d, and a drive circuit 37e. The current detector 37C measures the current value of the current with or by which the power storage device 36 is charged or discharged. The current detector 37C outputs the measured current value (detected current value) to the amplifier 37a of the auxiliary device 35.

The amplifier 37a amplifies the detected current value detected by the current detector 37C with a predetermined amplification factor. Then, the subtractor 37c calculates the deviation between the detected current value that is input from the current detector 32C of the main stabilizer 30 and the detected current value that is output by the amplifier 37a. The subtractor 37c outputs the calculated deviation to the charge/discharge controller 37d.

The charge/discharge controller 37d performs PWM control or the like to generate a drive pulse such that the detected current value that is output by the amplifier 37a becomes equal to the detected current value that is input from the current detector 32C of the main stabilizer 30.

The drive circuit 37e turns ON and OFF the semiconductor switching element of the DC/DC converter 37A in accordance with the drive pulse generated by the charge/discharge controller 37d. The DC/DC converter 37A controls the charge/discharge of the power storage device 36 as described above, such that the detected current value that is output by the amplifier 37a becomes equal to the detected current value that is input from the current detector 32C of the main stabilizer 30.

By the control circuit 37B performing control as described above, the power converter 37 performs charge/discharge control such that the power storage device 36 is charged with or discharged by a current having a current value corresponding to the current value of the current charged in or discharged from the main stabilizer 30.

In a case where the current value of the current charged in or discharged from the main stabilizer 30 is assumed as a current value Im, the current value of the current with or by which the power converter 37 charges or discharges the power storage device 36 is assumed as a current value Is, and a function that monotonically increases with respect to a variable x is assumed as F(x), for example, the control circuit 37B controls charge or discharge such that the current value Is becomes a value that is in accordance with the current value Im so as to satisfy the equation below. The signs of the current value Im and the current value Is are, for example, positive when they are a charge current.

$$Is=F(Im)$$

The function F(x) may be a linear function or a nonlinear function as long as it increases monotonically with respect to the variable x. For example, the current value Is may be made equal to the current value Im, or the current value Is may be made proportional to the current value Im. Further, the rate (slope) of the increase of the current value Is with respect to the increase of the current value Im is not limited to being constant, and the current value Is may be changed with respect to the current value Im such that, for example, the increase of the current value Is becomes gentler as the current value Im is greater.

The number of auxiliary devices 35 is not limited to one. For example, the DC bus control system 1 may include a plurality of auxiliary devices 35.

For example, in a case where a plurality of main stabilizers 30 are provided in order to increase the capacity of the main stabilizer 30, the plurality of main stabilizers 30, each of which controls the bus voltage of the DC bus 70, may conflict with each other in the control of the bus voltage and make the system unstable.

According to the DC bus control system 1 of the present embodiment, the bus voltage of the DC bus 70 is controlled by one main stabilizer 30, and it is possible to increase the charge/discharge capacity by copying the current, with or by which the power storage device 31 is charged or discharged, to the power storage device 36 of the auxiliary device 35. According to the DC bus control system 1 of the present embodiment, the bus voltage of the DC bus 70 is controlled by one main stabilizer 30, making it possible to control the bus voltage of the DC bus 70 stably.

Figure 6:
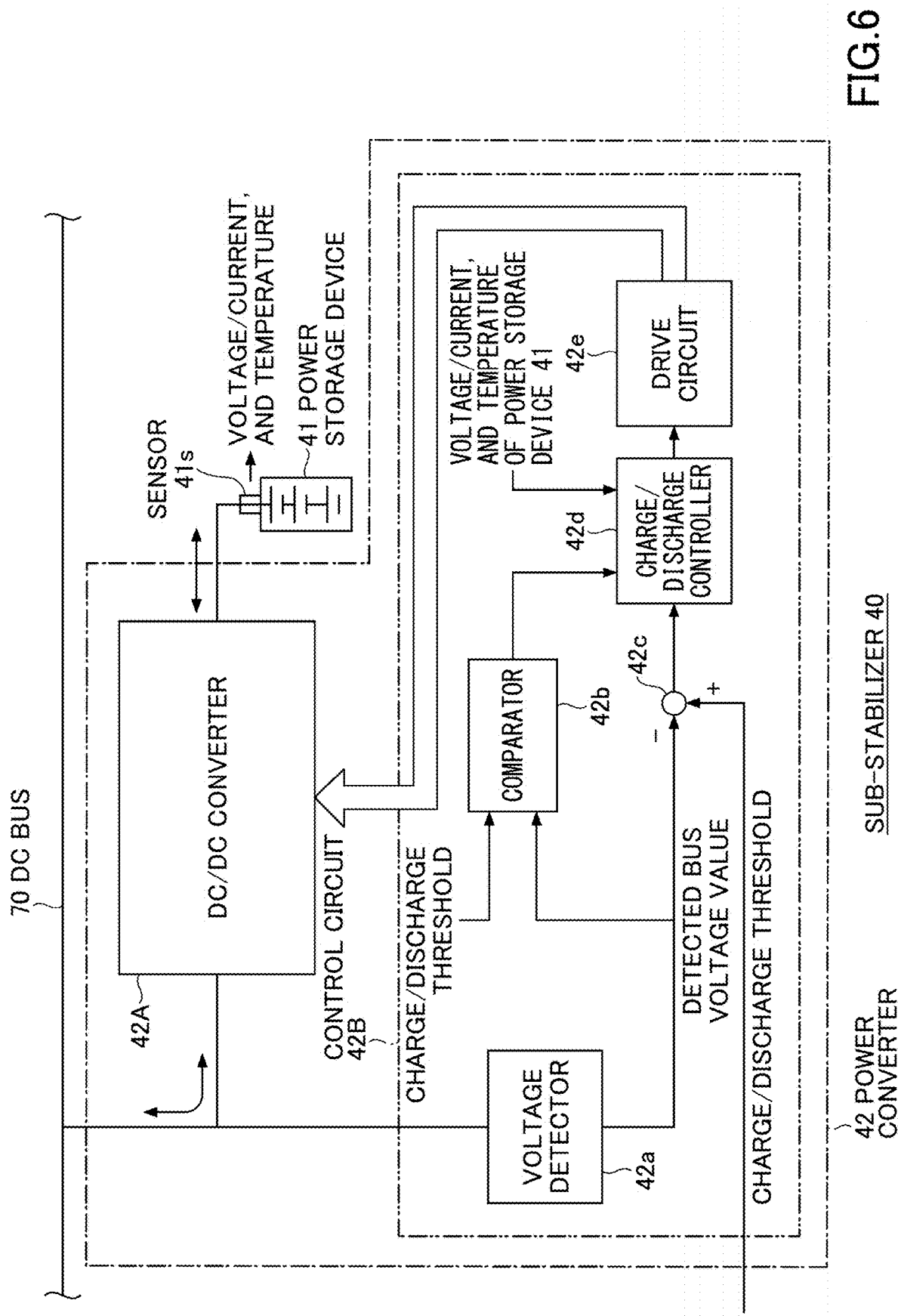
FIG. 6 is a block diagram illustrating an example of a configuration of a power converter of a sub-stabilizer.

FIG. 6 is a block diagram illustrating a configuration example of the power converter 42 of the sub-stabilizer 40. The power converter 47 of the sub-stabilizer 45 has the same configuration as that of the power converter 42. The power converter 42 includes a DC/DC converter 42A and a control circuit 42B. The power converter 42 has the same function as that of the power converter 32 of the main stabilizer 30 in that it causes the DC bus 70 and the power storage device 41 to bidirectionally transmit or receive a DC power to or from each other. Like the power storage device 31, the power storage device 41 includes a sensor 41s configured to detect voltage/current, and temperature.

The control circuit 42B includes a voltage detector 42a, a comparator 42b, a subtractor 42c, a charge/discharge controller 42d, and a drive circuit 42e.

The power converter 42 differs from the power converter 32 of the main stabilizer 30 in the following points. The charge/discharge controller 42d of the control circuit 42B calculates an input/output current target value based on the deviation between a charge/discharge threshold and a detected bus voltage value. The charge/discharge controller 42d further performs charge/discharge control of the power storage device 41 such that the input/output current of the DC/DC converter 42A becomes equal to the input/output current target value. The charge/discharge threshold may be a threshold (charge threshold and discharge threshold) relating to charge or discharge of the power storage device 41, and the input/output current target value may be determined in accordance with the difference between the charge/discharge threshold and the voltage of the DC bus 70.

The comparator 42b provided in the control circuit 42B compares the charge/discharge threshold of the power storage device 41 with the detected bus voltage value, and outputs a charge command or a discharge command in accordance with the relationship in magnitude between the charge threshold or discharge threshold and the detected bus voltage value to control the operation of the charge/discharge controller 42d. The charge/discharge threshold may be set by the control circuit 42B itself or received as a command from the monitor/instruction device 80.

Figure 7:
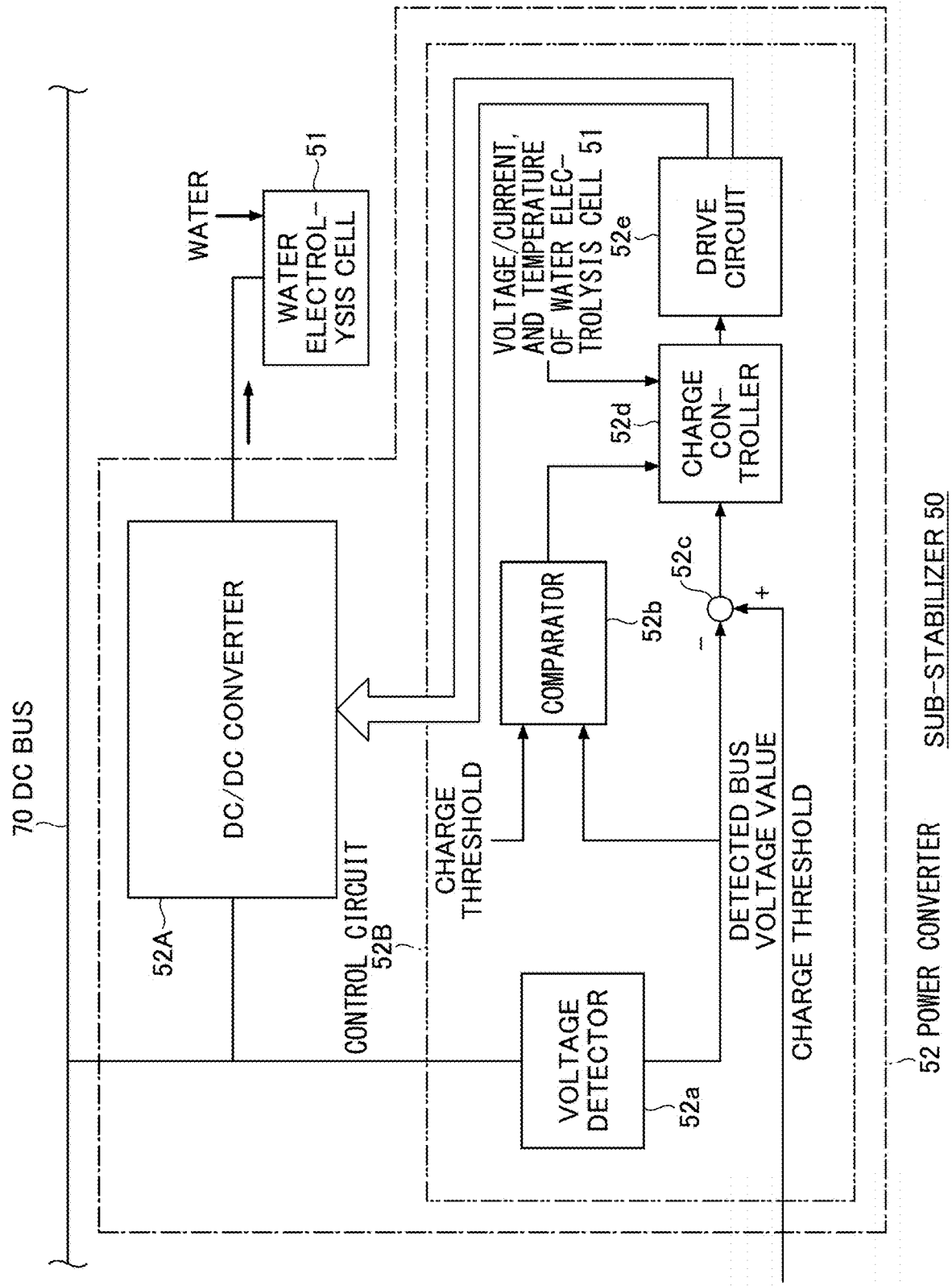
FIG. 7 is a block diagram illustrating an example of a configuration of a power converter of a sub-stabilizer.

FIG. 7 is a block diagram illustrating an example of a configuration of the power converter 52 of the sub-stabilizer 50. The power converter 57 of the sub-stabilizer 55 has the same configuration as that of the power converter 52. The power converter 52 includes a DC/DC converter 52A and a control circuit 52B.

The DC/DC converter 52A has a function of converting the DC power of the DC bus 70 to a predetermined level and supplying it to the water electrolysis cell 51. Part of the DC/DC converter 52A is constituted by an insulated DC/DC converter, a chopper, or the like including a semiconductor switching element.

The water electrolysis cell 51 electrolyzes water using a DC power supplied from the DC/DC converter 52A. Hydrogen gas generated by the water electrolysis cell 51 is stored in an external storage device (not illustrated). The water electrolysis cell 51 performs an operation of converting a DC power into hydrogen gas and storing it, in other words, a type of a charging operation.

The control circuit 52B configured to control the DC/DC converter 52A has the same configuration as that of the control circuit 42B. The control circuit 52B includes a voltage detector 52a, a comparator 52b, a subtractor 52c, a charge controller 52d, and a drive circuit 52e.

In the control circuit 52B, the voltage of the DC bus 70 is detected by the voltage detector 52a. The deviation between a charge threshold and the detected bus voltage value is calculated by the subtractor 52c. The deviation between the charge threshold and the detected bus voltage value is input into the charge controller 52d. Moreover, the detected bus voltage value is input into the comparator 52b together with the charge threshold. When the detected bus voltage value exceeds the charge threshold, the comparator 52b outputs a charge command to the charge controller 52d. The charge threshold corresponds to the voltage at which the water electrolysis cell 51 starts electrolysis. That is, the charge threshold is the threshold relating to charge of the water electrolysis cell 51.

The charge controller 52d calculates an input/output current target value based on the deviation between the charge threshold and the detected bus voltage value, which is input from the subtractor 52c. Then, the charge controller 52d generates a drive pulse as a charge command such that an input/output current of the DC/DC converter 52A becomes equal to the input/output current target value, and outputs the drive pulse to the drive circuit 52e. The drive circuit 52e turns ON or OFF the semiconductor switching element of the DC/DC converter 52A in accordance with the drive pulse generated by the charge controller 52d. The DC/DC converter 52A supplies a DC power to the water electrolysis cell 51 to electrolyze water.

The DC/DC converter 52A controls the DC power supplied to the water electrolysis cell 51 through the operation described above while also operating such that the input/output current becomes equal to the input/output current target value.

In regard to the sub-stabilizer 60, when seeing a power generation operation of the fuel cell 61 as a discharge operation, configuring the sub-stabilizer 60 only requires the water electrolysis cell 51, the charge threshold, and the charge controller 52d of the sub-stabilizer 50 to be replaced with the fuel cell 61, a discharge threshold, and a discharge controller, respectively. The discharge threshold corresponds to the voltage at which the fuel cell 61 starts power generation. The power converter 57 of the sub-stabilizer 55 has the same configuration as that of the power converter 52.

When a detected bus voltage value falls below the discharge threshold, the sub-stabilizer 60 outputs a drive pulse corresponding to a discharge command to the discharge controller to operate the DC/DC converter. By operating the DC/DC converter, the sub-stabilizer 60 supplies a power generated by the fuel cell 61 to the DC bus 70 via the DC/DC converter.

The DC/DC converter controls the power to be generated by the fuel cell 61 through the operation described above while also operating such that an input/output current becomes equal to an input/output current target value.

Each of the water electrolysis cell 51, the water electrolysis cell 56, the fuel cell 61, and the fuel cell 66 is provided with a sensor configured to detect voltage/current, temperature, and the like, and values detected by the sensor are input into the charge controller 52d and the discharge controller. However, the sensors are not illustrated in the drawings.

Further, the charge threshold and the discharge threshold may be set by each control circuit itself or received as a command from the monitor/instruction device 80.

The configurations and operations of the power converter 12, the power converter 32, the power converter 37, the power converter 42, and the power converter 52 illustrated in FIGS. 3 to 7, in particular, the control circuit 12B, the control circuit 32B, the control circuit 37B, the control circuit 42B, and the control circuit 52B, are only exemplary and do not limit the technical scope of the present invention in any way. Naturally, it is possible to employ configurations different from those above.

Figure 8:
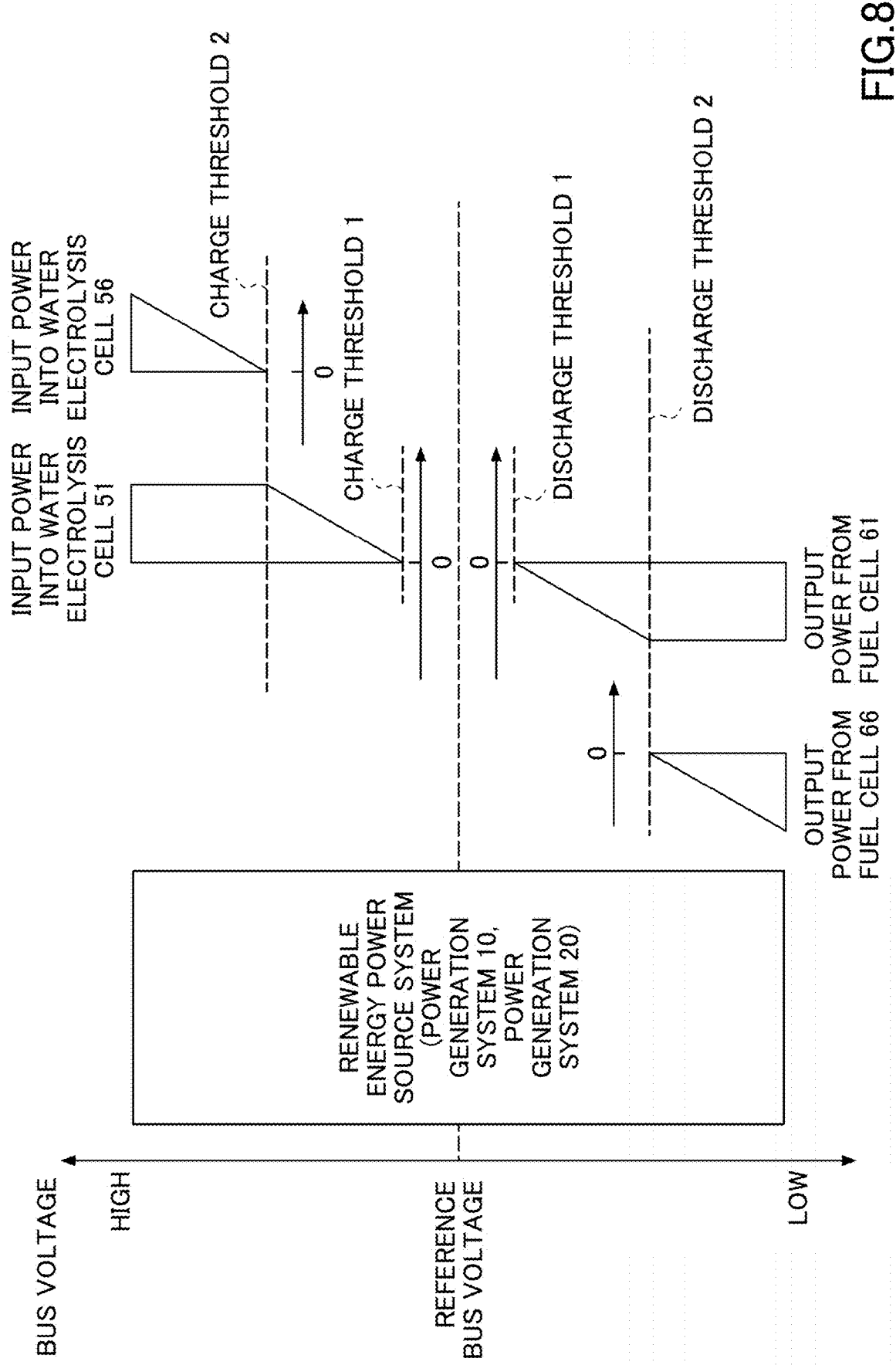
FIG. 8 is a diagram illustrating an operation of the DC bus control system according to the present embodiment.

Next, input power into the water electrolysis cell 51 of the sub-stabilizer 50 and the water electrolysis cell 56 of the sub-stabilizer 55, and output power from the fuel cell 61 of the sub-stabilizer 60 and the fuel cell 66 of the sub-stabilizer 65 with respect to the voltage of the DC bus 70 will be described. FIG. 8 is a conceptual diagram exemplarily illustrating the input power into the water electrolysis cell 51 of the sub-stabilizer 50 and the water electrolysis cell 56 of the sub-stabilizer 55, and the output power from the fuel cell 61 of the sub-stabilizer 60 and the fuel cell 66 of the sub-stabilizer 65 with respect to the voltage of the DC bus 70. The abscissa-direction width of triangular symbols and trapezoidal symbols in FIG. 8 indicates the magnitude of each power, and the wider the width, the larger the power value.

In FIG. 8, each symbol comes with an abscissa indicating power. On the abscissa indicating power, a power (current) supply from the DC bus, i.e., a charge, is positive. On the abscissa indicating power, a power (current) supply to the DC bus, i.e., a discharge, is negative. The abscissa of each symbol indicates power. However, when power is read as current, the same meaning will also be conveyed. The same applies to the drawings to follow.

FIG. 8 illustrates a case where the input power source is a renewable energy power system, which includes, for example, either or both of the solar power generation system 10 and the wind-force power generation system 20 illustrated in FIG. 1. Operations for the water electrolysis cell 51 and the water electrolysis cell 56 to be charged, and operations for the fuel cell 61 and the fuel cell 66 to be discharged are controlled in accordance with the voltage of the DC bus 70 to which the power generated by the renewable energy power system is supplied. Operations for the respective parts to be charged or discharged are controlled in accordance with the voltage of the DC bus 70 to which the powers generated by the solar power generation system 10 and the wind-force power generation system 20 are supplied, the charge thresholds of the water electrolysis cell 51 and the water electrolysis cell 56, the discharge thresholds of the fuel cell 61 and the fuel cell 66, and the like.

By controlling charge and discharge operations by changing the charge thresholds of the water electrolysis cell 51 and the water electrolysis cell 56 and the discharge thresholds of the fuel cell 61 and the fuel cell 66, it is possible to individually adjust the DC power which the DC bus 70 and each of the sub-stabilizer 50, the sub-stabilizer 55, the sub-stabilizer 60, and the sub-stabilizer 65 transmit to or receive from each other. In other words, it is possible to minutely control the operation of each power buffer.

The water electrolysis cell 51, the water electrolysis cell 56, the fuel cell 61, and the fuel cell 66 have been described with reference to FIG. 8. However, the same applies to the power storage device 41 and the power storage device 46. By controlling the charge and discharge operations by changing the charge/discharge thresholds of the power storage device 41 and the power storage device 46, it is possible to individually adjust the DC power which the DC bus 70 and each of the sub-stabilizer 40 and the sub-stabilizer 45 transmit to or receive from each other. In other words, it is possible to minutely control the operation of each power buffer.

Further, the power storage device 41, the power storage device 46, the water electrolysis cell 51, the water electrolysis cell 56, the fuel cell 61, and the fuel cell 66 may be combined. That is, the DC power transferred between the DC bus 70 and the sub-stabilizer 40, the sub-stabilizer 45, the sub-stabilizer 50, the sub-stabilizer 55, the sub-stabilizer 60, and the sub-stabilizer 65 may be individually adjusted.

The charge threshold and the discharge threshold may be changed based on instructions from the monitor/instruction device 80, or the power converter 42, the power converter 47, the power converter 52, the power converter 57, the power converter 62, and the power converter 67 may each change the thresholds themselves.

First, the fuel cell 61 and the fuel cell 66 will be described. As illustrated in FIG. 8, the discharge threshold 1 of the fuel cell 61 of the sub-stabilizer 60 is higher than the discharge threshold 2 of the fuel cell 66 of the sub-stabilizer 65.

Regarding the fuel cell 61, when the bus voltage decreases from the reference bus voltage to become equal to or lower than the discharge threshold 1, a power (output power) is supplied from the fuel cell 61 to the DC/DC converter of the power converter 62. The power (output power) from the fuel cell 61 to the DC/DC converter of the power converter 62 is higher as the bus voltage is lower. When the bus voltage becomes equal to or lower than the discharge threshold 2, the power (output power) from the fuel cell 61 to the DC/DC converter of the power converter 62 becomes constant.

Regarding the fuel cell 66, when the bus voltage decreases from the reference bus voltage to become equal to or lower than the discharge threshold 2, a power (output power) is supplied from the fuel cell 66 to the DC/DC converter of the power converter 67. The power (output power) from the fuel cell 66 to the DC/DC converter of the power converter 67 is higher as the bus voltage is lower.

When the bus voltage is between the discharge threshold 1 and the discharge threshold 2, power is supplied from the fuel cell 61 to the DC bus 70, but no power is supplied from the fuel cell 66.

Next, the water electrolysis cell 51 and the water electrolysis cell 56 will be described. As illustrated in FIG. 8, the charge threshold 1 of the water electrolysis cell 51 of the sub-stabilizer 50 is lower than the charge threshold 2 of the water electrolysis cell 56 of the sub-stabilizer 55.

Regarding the water electrolysis cell 51, when the bus voltage increases from the reference bus voltage to become equal to or higher than the charge threshold 1, a power (input power) is supplied from the DC/DC converter 52A of the power converter 52 to the water electrolysis cell 51. The power (input power) from the DC/DC converter 52A of the power converter 52 into the water electrolysis cell 51 is higher as the bus voltage is higher. When the bus voltage becomes equal to or higher than the charge threshold 2, the power (input power) from the DC/DC converter of the power converter 52 into the water electrolysis cell 51 becomes constant.

Regarding the water electrolysis cell 56, when the bus voltage further increases from the reference bus voltage to become equal to or higher than the charge threshold 2, a power (input power) is supplied from the DC/DC converter of the power converter 57 to the water electrolysis cell 56. The power (input power) from the DC/DC converter of the power converter 57 into the water electrolysis cell 56 is higher as the bus voltage is higher.

When the bus voltage is between the charge threshold 1 and the charge threshold 2, power is supplied to the water electrolysis cell 51 from the DC bus 70, but the no power is supplied to the water electrolysis cell 56 from the DC bus 70.

Figure 9:
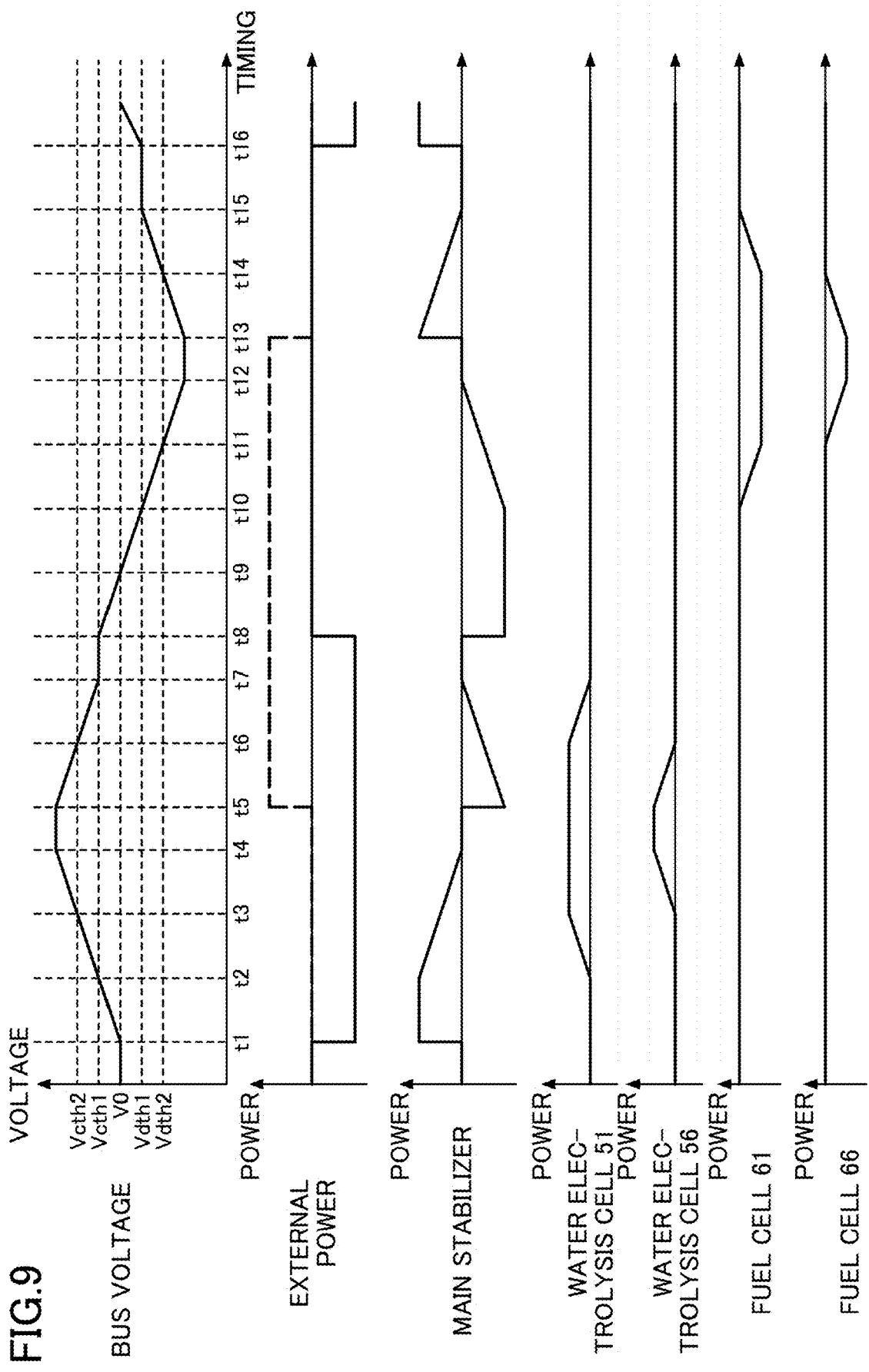
FIG. 9 is a diagram illustrating an operation of the DC bus control system according to the present embodiment.

Next, the operation of the DC bus control system 1 according to the present embodiment will be described. FIG. 9 is a diagram illustrating the operation of the DC bus control system 1 according to the present embodiment. The abscissa of each graph indicates the time. The ordinate of each graph indicates voltage or power.

From top to bottom, the graphs illustrate the bus voltage of the DC bus 70, the external power relating to the solar power generation system 10 and the wind-force power generation system 20 (input power sources) and the load 90, and powers of the main stabilizers, the water electrolysis cell 51, the water electrolysis cell 56, the fuel cell 61, and the fuel cell 66. Regarding the external power, the solid line denotes the power relating to the input power sources (the solar power generation system 10 and the wind-force power generation system 20), and the dotted line denotes the power relating to the load. The main stabilizers are the main stabilizer 30 and the auxiliary device 35. The power supplied from the DC bus 70 is positive, and the power supplied to the DC bus 70 is negative.

Regarding the bus voltage, V0 indicates the reference bus voltage, Vcth1 indicates the charge threshold 1, Vcth2 indicates the charge threshold 2, Vdth1 indicates the discharge threshold 1, and Vdth2 indicates the discharge threshold 2.

The bus voltage when the DC bus control system 1 starts to operate is assumed to be the reference bus voltage V0. When the DC bus control system 1 just starts to operate, it is assumed that the external power, i.e., the power from the input power sources and the power to the load 90, are not supplied, and that the main stabilizers, the water electrolysis cell 51, the water electrolysis cell 56, the fuel cell 61, and the fuel cell 66 are not operating.

At the timing t1, the input power sources (the solar power generation system 10 and the wind-force power generation system 20) start to operate. At the timing t1 at which the input power sources start to operate, because the bus voltage is higher than the discharge threshold 1 Vdth1 and lower than the charge threshold 1 Vcth1, the water electrolysis cell 51 and the water electrolysis cell 56 are not being charged, and the fuel cell 61 and the fuel cell 66 are not being discharged. Therefore, the main stabilizers are charged with power from the DC bus 70. In response to the main stabilizers being supplied with power from the DC bus 70, the bus voltage increases in accordance with the charge rate of the main stabilizers.

When the bus voltage becomes equal to or higher than the charge threshold 1 Vcth1 at the timing t2, the water electrolysis cell 51 starts to be charged from the DC bus 70. In the meantime, because the bus voltage is lower than the charge threshold 2 Vcth2, the water electrolysis cell 56 does not start to be charged. The power to the main stabilizers decreases in accordance with the power to the water electrolysis cell 51. The bus voltage continues to increase in accordance with the charge rate of the main stabilizers.

When the bus voltage becomes equal to or higher than the charge threshold 2 Vcth2 at the timing t3, the water electrolysis cell 56 starts to be charged from the DC bus 70. The water electrolysis cell 51 is charged with a constant power (current). The power to the main stabilizers decreases in accordance with the power to the water electrolysis cell 51 and the water electrolysis cell 56. The bus voltage continues to increase in accordance with the charge rate of the main stabilizers.

At the timing t4, the power to the main stabilizers becomes zero. Therefore, the bus voltage becomes a constant voltage.

Next, at the timing t5, the load 90 starts to operate. It is assumed that the power from the input power sources and the power to the load 90 are equal. Upon starting to operate, the load 90 is supplied with power from the main stabilizers. In response to power being supplied from the main stabilizers, their charge rate decreases, and the bus voltage decreases. In response to the decrease in the bus voltage, the power charged in the water electrolysis cell 56 decreases.

When the bus voltage becomes lower than the charge threshold 2 Vcth2 at the timing t6, the water electrolysis cell 56 stops being charged from the DC bus 70. Due to power being supplied from the main stabilizers, their charge rate decreases, and the bus voltage decreases. Due to the decrease in the bus voltage, charge into the water electrolysis cell 51 gradually decreases.

When the bus voltage becomes lower than the charge threshold 1 Vcth1 at the timing t7, the water electrolysis cell 51 stops being charged from the DC bus 70. Since the main stabilizers are not being discharged and charged, the bus voltage is constant.

Next, at the timing t8, the external power sources stop. When the external power sources stop, the main stabilizers start to be discharged to the DC bus 70. Since the bus voltage is higher than the discharge threshold 1 Vdth1 and lower than the charge threshold 1 Vcth1, the water electrolysis cell 51 and the water electrolysis cell 56 are not being charged, and the fuel cell 61 and the fuel cell 66 are not being discharged. Therefore, the main stabilizers are discharged to the DC bus 70. By the main stabilizers supplying power to the DC bus 70, the bus voltage decreases in accordance with the charge rate of the main stabilizers.

At the timing t9, the bus voltage becomes equal to the reference bus voltage V0 and further decreases.

When the bus voltage becomes equal to or lower than the discharge threshold 1 Vdth1 at the timing t10, the fuel cell 61 is discharged to the DC bus 70. In the meantime, since the bus voltage is higher than the discharge threshold 2 Vdth2, the fuel cell 66 is not discharged to the DC bus 70. The power from the main stabilizers decreases proportionately to the power from the fuel cell 61. The bus voltage continues to decrease in accordance with the charge rate of the main stabilizers.

When the bus voltage becomes equal to or lower than the discharge threshold 2 Vdth2 at the timing t11, the fuel cell 66 is discharged to the DC bus 70, and the DC bus is charged from the fuel cell 61 with a constant power (current). The power from the main stabilizers decreases proportionately to the power to the fuel cell 61 and the fuel cell 66. The bus voltage continues to decrease in accordance with the charge rate of the main stabilizers.

At the timing t12, the power to the main stabilizers becomes 0. Therefore, the bus voltage becomes a constant voltage.

Next, at the timing t13, the load 90 stops operating. In response to the load 90 stopping operating, power is supplied to the main stabilizers. In response to power being supplied to the main stabilizers, the charge rate increases and the bus voltage increases. In response to the increase in the bus voltage, the power to be discharged from the fuel cell 66 decreases.

When the bus voltage becomes higher than the discharge threshold 2 Vdth2 at the timing t14, the fuel cell 66 stops being discharged to the DC bus 70. Because power is being supplied to the main stabilizers, the charge rate increases and the bus voltage increases. Due to the increase in the bus voltage, discharge from the fuel cell 61 gradually decreases.

When the bus voltage becomes higher than the discharge threshold 1 Vdth1 at the timing t15, the fuel cell 61 stops being discharged to the DC bus 70. Since the main stabilizers are not being discharged and charged, the bus voltage becomes constant.

At the timing t16, the input power sources start to operate. At the timing t16 at which the input power sources start to operate, because the bus voltage is higher than the discharge threshold 1 Vdth1 and lower than the charge threshold 1 Vcth1, the water electrolysis cell 51 and the water electrolysis cell 56 are not being charged, and the fuel cell 61 and the fuel cell 66 are not being discharged. Therefore, power is supplied to the main stabilizers from the DC bus 70. In response to power being supplied to the main stabilizers from the DC bus 70, the bus voltage increases in accordance with the charge rate of the main stabilizers. The following operation will be performed in the same manner.

Figure 10:
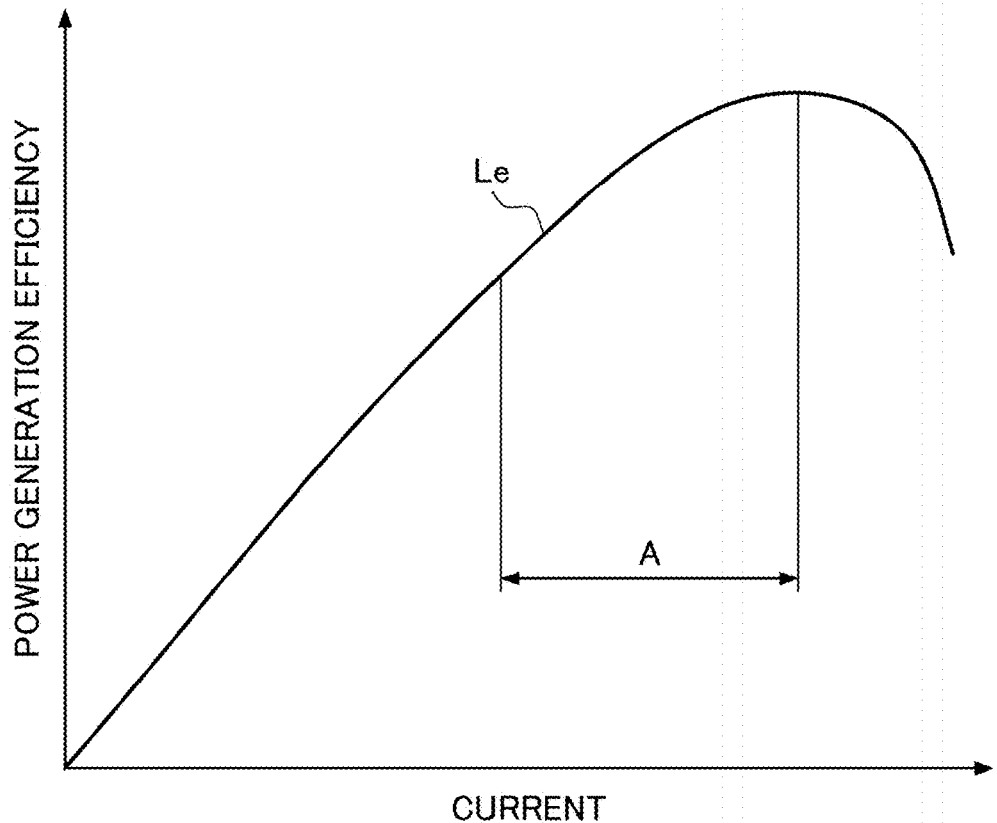
FIG. 10 is a diagram illustrating the power generation efficiency of a fuel cell.

FIG. 10 is a conceptual diagram illustrating the power generation efficiency of a fuel cell. In FIG. 10, the abscissa represents the current flowing in the fuel cell, and the ordinate represents the power generation efficiency of the fuel cell. The line Le conceptually represents the power generation efficiency of the fuel cell. The power generation efficiency of the fuel cell is higher as the current is higher. Since the voltage from the fuel cell is approximately constant in a use range, the power generation efficiency is higher as the current is higher, i.e., as the power is higher. Therefore, it is desirable to use approximately the range A of the fuel cell as illustrated in FIG. 10 in terms of the power generation efficiency.

Therefore, the DC bus control system 1 according to the present embodiment operates only the fuel cell 61 when the bus voltage is high, specifically, when the bus voltage is equal to or lower than the discharge threshold 1 and higher than the discharge threshold 2. The DC bus control system 1 according to the present embodiment operates both the fuel cell 61 and the fuel cell 66 when the bus voltage becomes lower, specifically, when the bus voltage becomes equal to or lower than the discharge threshold 2. In particular, when the bus voltage is equal to or lower than the discharge threshold 2, the fuel cell 61 can be operated in a range in which it has a high power generation efficiency.

For example, operating the fuel cell 61 and the fuel cell 66 simultaneously when the discharge threshold becomes equal to or lower than the discharge threshold 1 means operating the fuel cell 61 and the fuel cell 66 in ranges in which they have a low power generation efficiency, resulting in a low efficiency of the entire DC bus control system.

The DC bus control system 1 according to the present embodiment can operate the fuel cell 61 in a range in which it has a high power generation efficiency, by operating only the fuel cell 61 when the bus voltage is high. Therefore, the DC bus control system 1 according to the present embodiment can efficiently supply power to the DC bus 70.

In addition, it is possible to realize the DC bus control system 1 according to the present embodiment, by using the sub-stabilizer 60 and the sub-stabilizer 65 having the same configuration but by varying the discharge threshold between them. Therefore, it is possible to realize the DC bus control system 1 according to the present embodiment, by increasing the number of sub-stabilizers to be installed while not varying them in type but varying the conditions, making it possible to save the manufacturing cost and the installation cost.

Figure 11:
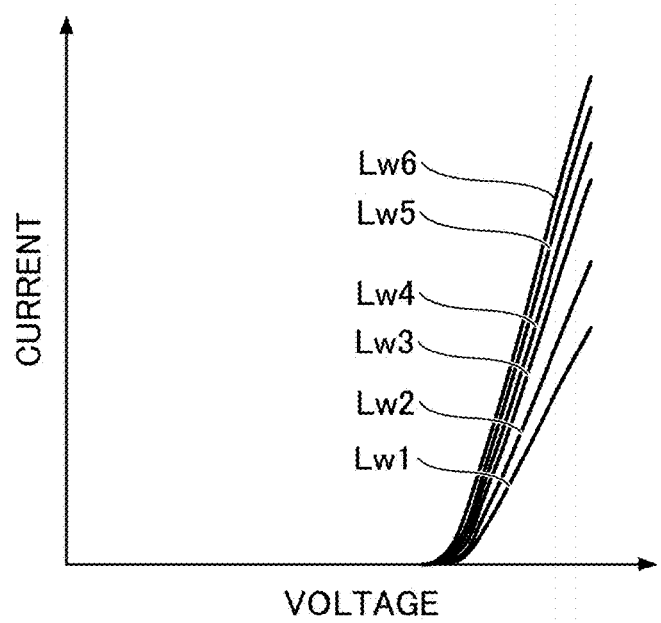
FIG. 11 is a diagram illustrating characteristics of a water electrolysis cell with respect to temperature.

FIG. 11 is a conceptual diagram illustrating the characteristics of a water electrolysis cell with respect to temperature. In FIG. 11, the abscissa indicates the voltage supplied to the water electrolysis cell, and the ordinate indicates the current flowing through the water electrolysis cell. The line Lw1, the line Lw2, the line Lw3, the line Lw4, the line Lw5, and the line Lw6 conceptually indicate the relationship between voltage and current when the operating temperature of the water electrolysis cell is 24° C., 40° C., 50° C., 60° C., 70° C., and 80° C., respectively.

As the operating temperature of the water electrolysis cell increases, the current flowing through the water electrolysis cell increases. As the current flowing through the water electrolysis cell increases, the hydrogen production proportional to the current increases. Therefore, in a case of operating water electrolysis cells, operating fewer cells at higher cell temperatures enables an efficient water electrolysis.

Therefore, the DC bus control system 1 according to the present embodiment operates only the water electrolysis cell 51 when the bus voltage is low, specifically, when the bus voltage is equal to or higher than the charge threshold 1 and lower than the charge threshold 2. The DC bus control system 1 according to the present embodiment operates both the water electrolysis cell 51 and the water electrolysis cell 56 when the bus voltage is higher, specifically, when the bus voltage is equal to or higher than the charge threshold 2. In particular, when the bus voltage is equal to or higher than the charge threshold 2, the water electrolysis cell 51 can be operated in a range in which it has a high water electrolysis efficiency.

For example, operating the water electrolysis cell 51 and the water electrolysis cell 56 simultaneously when the charge threshold becomes equal to or higher than the charge threshold 1 means operating the water electrolysis cell 51 and the water electrolysis cell 56 in ranges in which they have a low water electrolysis efficiency, resulting in a low efficiency of the entire DC bus control system.

The DC bus control system 1 according to the present embodiment can operate the water electrolysis cell 51 in a range in which it has a high efficiency, by operating only the water electrolysis cell 51 when the bus voltage is low. Therefore, the DC bus control system 1 according to the present embodiment can be efficiently charged with power from the DC bus 70.

In addition, it is possible to realize the DC bus control system 1 according to the present embodiment by using the sub-stabilizer 50 and the sub-stabilizer 55 having the same configuration, but by varying the charge threshold between them. Therefore, it is possible to realize the DC bus control system 1 according to the present embodiment by increasing the number of sub-stabilizer to be installed while not varying them in type but varying the conditions, making it possible to save the manufacturing cost and the installation cost.

Although the foregoing descriptions have illustrated the cases in which two sub-stabilizers are provided, the same control may be performed on three or more sub-stabilizers. For example, when the number of sub-stabilizers is three, the thresholds may be set such that the number of sub-stabilizers to be operated becomes greater in an order of one, two, and three as the bus voltage becomes more deviated from the reference bus voltage.

In addition, the threshold relationship may be reversed for the sub-stabilizer 50 and the sub-stabilizer 55, and for the sub-stabilizer 60 and the sub-stabilizer 65. For example, the sub-stabilizer 55 may be operated when the bus voltage is close to the reference bus voltage, and the sub-stabilizer 50 may be operated after the bus voltage becomes more deviated from the reference bus voltage. While the DC bus control system 1 is being operated, the threshold relationship may be reversed for the sub-stabilizer 50 and the sub-stabilizer 55, and for the sub-stabilizer 60 and the sub-stabilizer 65. For example, in a given period, the sub-stabilizer 50 may be operated when the bus voltage is close to the reference bus voltage, and in another period, the sub-stabilizer 55 may be operated when the bus voltage is close to the reference bus voltage.

Modified Example of the Operation of the DC Bus Control System 1

Modified Example 1

In the DC bus control system 1 according to the present embodiment, the input power into the water electrolysis cell 56 when the bus voltage is at the charge threshold 2 is 0. In the DC bus control system 1 according to the present embodiment, the output power from the fuel cell 66 when the bus voltage is at the discharge threshold 2 is 0.

Figure 12:
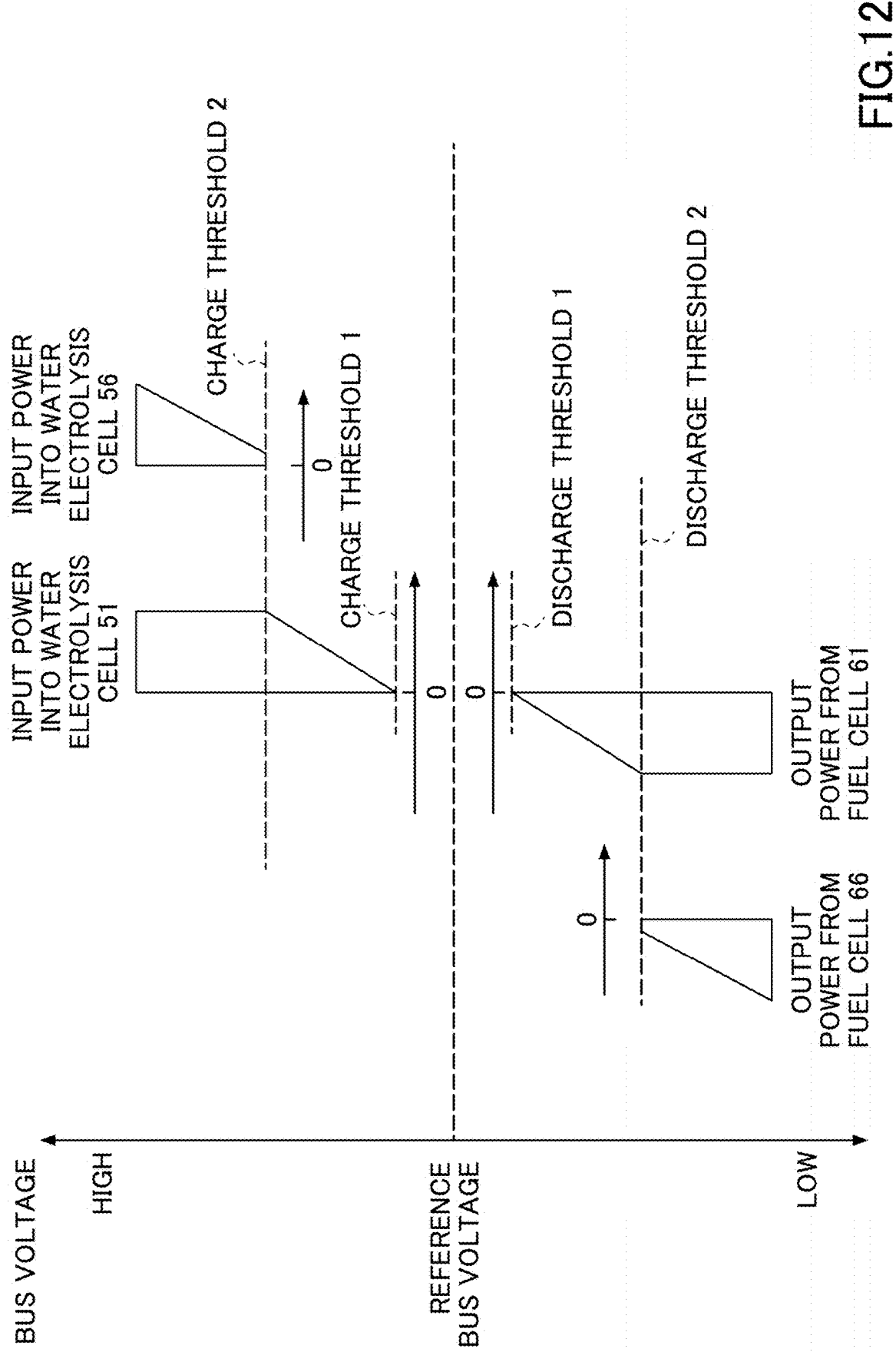
FIG. 12 is a diagram illustrating a modified example of the operation of the DC bus control system according to the present embodiment.

In the modified example 1, the input power into the water electrolysis cell 56 when the bus voltage is at the charge threshold 2 is offset from 0. In the modified example 1, the output power from the fuel cell 66 when the bus voltage is at the discharge threshold 2 is offset from 0. FIG. 12 is a diagram illustrating the modified example 1 of the operation of the DC bus control system 1 according to the present embodiment.

In the modified example 1, it is possible to operate the water electrolysis cell 56 in a range in which it has a higher water electrolysis efficiency, by offsetting from 0, the input power into the water electrolysis cell 56 when the bus voltage is at the charge threshold 2. In the modified example 1, it is possible to operate the fuel cell 66 in a range in which it has a higher power generation efficiency, by offsetting from 0, the output power from the fuel cell 66 when the bus voltage is at the discharge threshold 2.

The input/output voltage of the water electrolysis cell 51 and the fuel cell 61 at the discharge threshold 1 or the charge threshold 1 may also be offset from 0.

Modified Example 2

In the DC bus control system 1 according to the present embodiment, the input power into the water electrolysis cell 56 when the bus voltage is between the charge threshold 1 and the charge threshold 2 is 0. In the DC bus control system 1 according to the present embodiment, the output power from the fuel cell 66 when the bus voltage is between the discharge threshold 1 and the discharge threshold 2 is 0.

Figure 13:
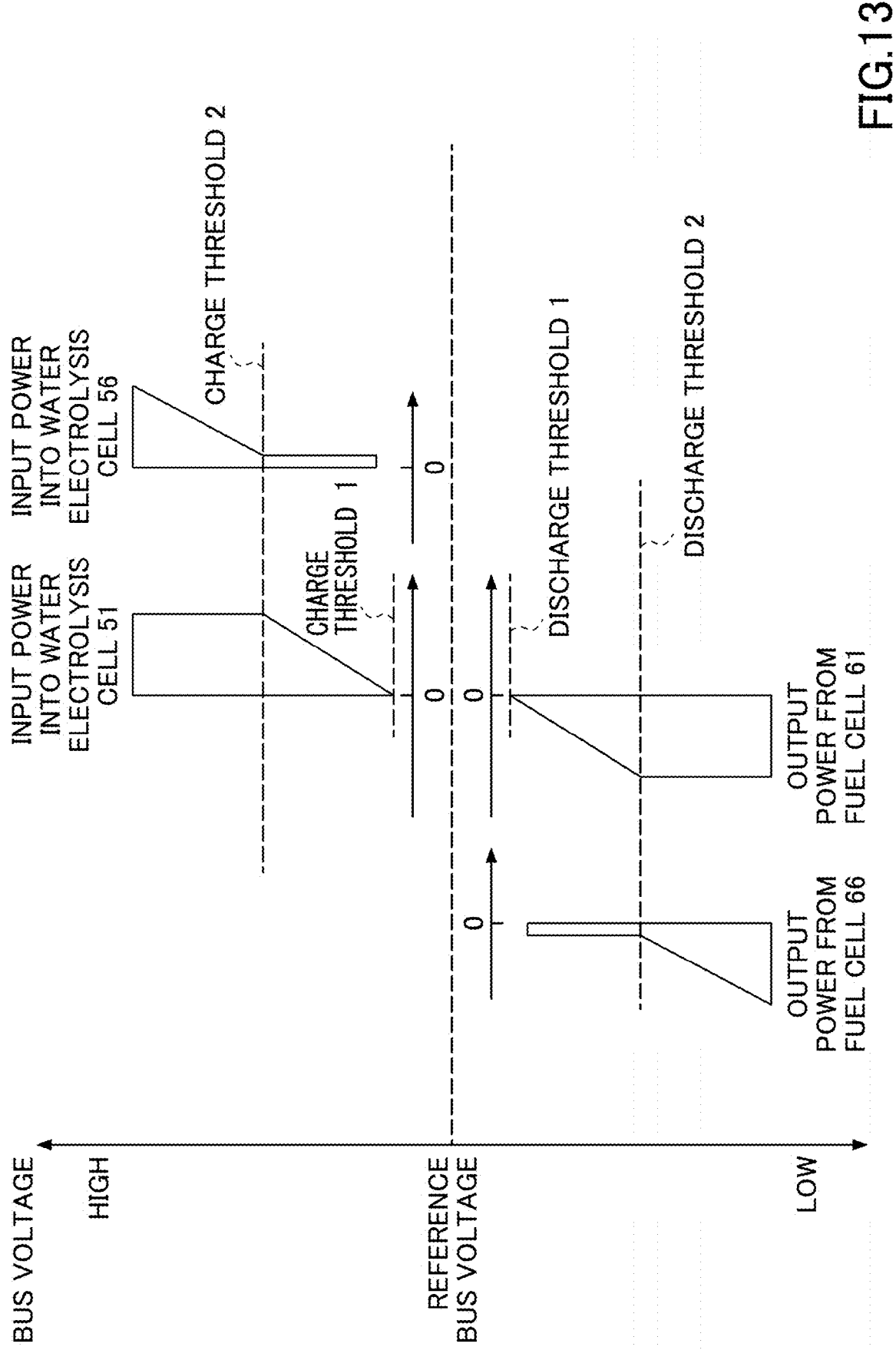
FIG. 13 is a diagram illustrating a modified example of the operation of the DC bus control system according to the present embodiment.

In the modified example 2, the input power into the water electrolysis cell 56 when the bus voltage is between the charge threshold 1 and the charge threshold 2 is offset from 0. In the modified example 2, the output power from the fuel cell 66 when the bus voltage is between the discharge threshold 1 and the discharge threshold 2 is offset from 0. FIG. 13 is a diagram illustrating the modified example 2 of the operation of the DC bus control system 1 according to the present embodiment.

In the modified example 2, it is possible to run the water electrolysis cell 56 idle and shorten its start-up time, by offsetting from 0, the input power into the water electrolysis cell 56 when the bus voltage is between the charge threshold 1 and the charge threshold 2. In the modified example 2, it is possible to run the fuel cell 66 idle and shorten its start-up time, by offsetting from 0, the output power from the fuel cell 66 when the bus voltage is between the discharge threshold 1 and the discharge threshold 2.

The input/output voltage of the water electrolysis cell 51 and the fuel cell 61 at equal to or lower than the charge threshold 1 or at equal to or higher than the discharge threshold 1 may also be offset from 0.

Modified Example 3

In the DC bus control system 1 according to the present embodiment, while the bus voltage is equal to or higher than the charge threshold 2, the input power into the water electrolysis cell 56 is proportional to the bus voltage. In the DC bus control system 1 according to the present embodiment, while the bus voltage is equal to or lower than the discharge threshold 2, the output power from the fuel cell 66 is proportional to the bus voltage.

Figure 14:
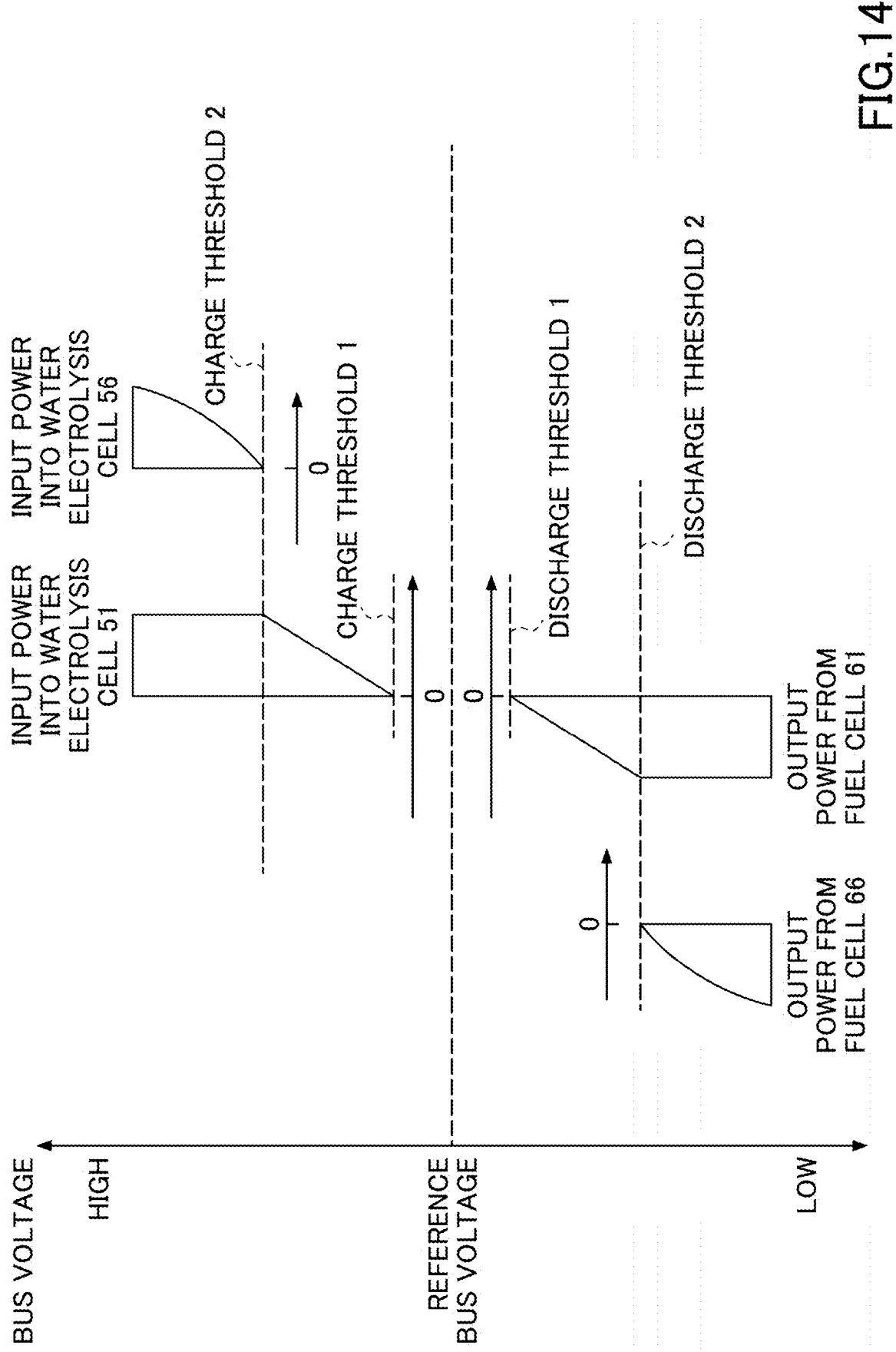
FIG. 14 is a diagram illustrating a modified example of the operation of the DC bus control system according to the present embodiment.

In the modified example 3, while the bus voltage is equal to or higher than the charge threshold 2, the input power into the water electrolysis cell 56 changes nonlinearly with the bus voltage. In the modified example 3, while the bus voltage is equal to or lower than the discharge threshold 2, the output power from the fuel cell 66 changes nonlinearly with respect to the bus voltage. FIG. 14 is a diagram illustrating the modified example 3 of the operation of the DC bus control system 1 according to the present embodiment.

In the modified example 3, by changing the input power into the water electrolysis cell 56 nonlinearly with respect to the bus voltage while the bus voltage is equal to or higher than the charge threshold 2, it is possible to ease the constraints on the device type and the control method, and to expand the selection and application of the device. In the modified example 3, by changing the output power from the fuel cell 66 nonlinearly with respect to the bus voltage while the bus voltage is equal to or lower than the discharge threshold 2, it is possible to ease the constraints on the device type and the control method, and to expand the selection and application of the device.

The input/output voltage of the water electrolysis cell 51 and the fuel cell 61 may also be changed nonlinearly.

Modified Example 4

In the DC bus control system 1 according to the present embodiment, while the bus voltage is equal to or higher than the charge threshold 2, the input power into the water electrolysis cell 51 is constant with respect to the bus voltage. In the DC bus control system 1 according to the present embodiment, while the bus voltage is equal to or lower than the discharge threshold 2, the output power from the fuel cell 61 is constant with respect to the bus voltage.

Figure 15:
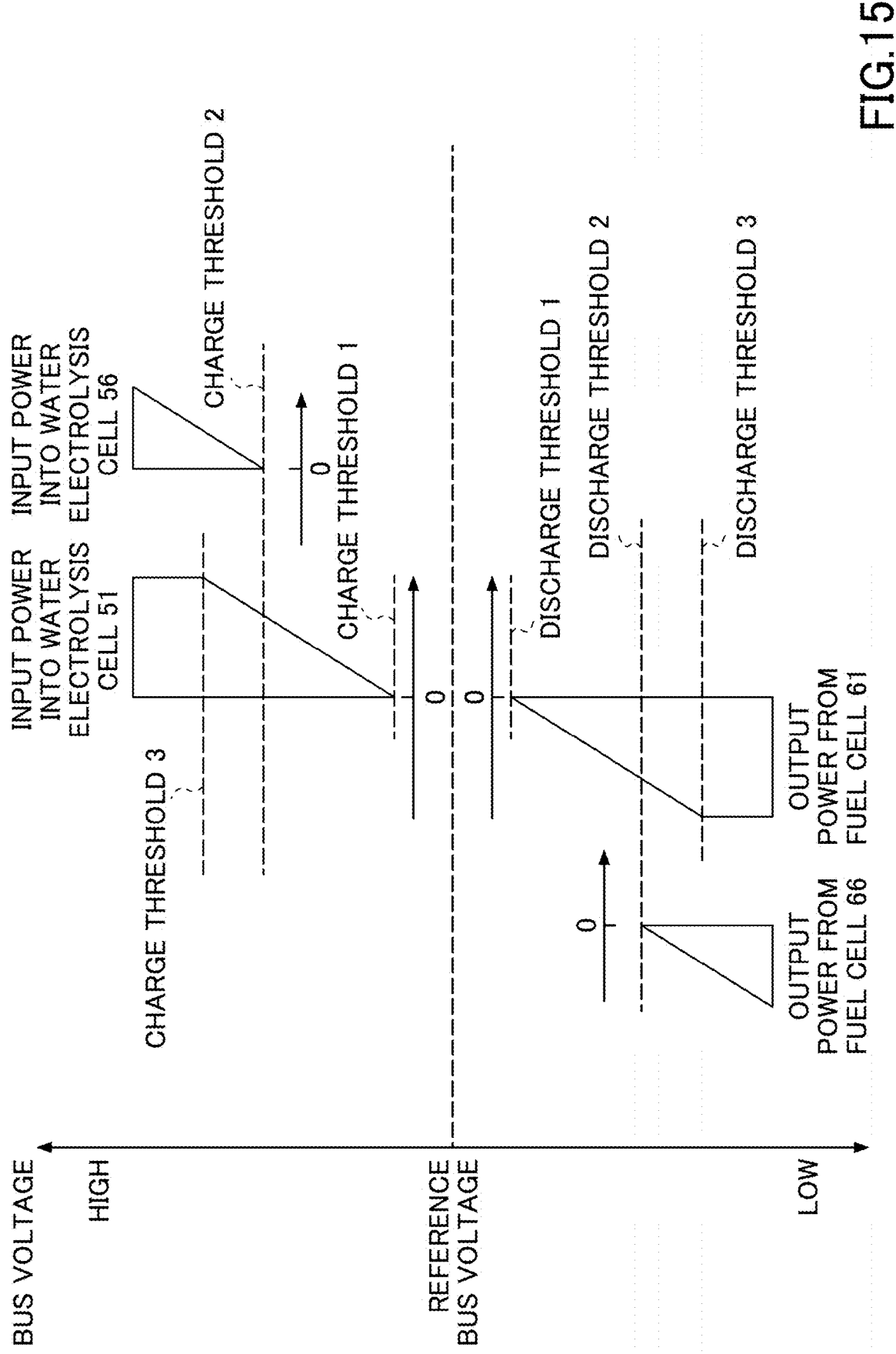
FIG. 15 is a diagram illustrating a modified example of the operation of the DC bus control system according to the present embodiment.

In the modified example 4, while the bus voltage is equal to or higher than the charge threshold 2 and lower than a charge threshold 3 that is higher than the charge threshold 2, the input power into the water electrolysis cell 51 is changed with respect to the bus voltage. In the modified example 4, while the bus voltage is equal to or higher than the charge threshold 3, the input voltage into the water electrolysis cell 51 is kept constant with respect to the bus voltage. In the modified example 4, while the bus voltage is equal to or lower than the discharge threshold 2 and higher than a discharge threshold 3 that is lower than the discharge threshold 2, the output power from the fuel cell 61 is changed with respect to the bus voltage. In the modified example 4, while the bus voltage is equal to or lower than the discharge threshold 3, the output voltage from the fuel cell 61 is kept constant with respect to the bus voltage. FIG. 15 is a diagram illustrating the modified example 4 of the operation of the DC bus control system 1 according to the present embodiment.

In the modified example 4, by keeping the input voltage into the water electrolysis cell 51 constant with respect to the bus voltage while the bus voltage is equal to or higher than the charge threshold 3, it is possible to ease the constraints on the control method. In the modified example 4, by keeping the output voltage from the fuel cell 61 constant with respect to the bus voltage while the bus voltage is equal to or lower than the discharge threshold 3, it is possible to ease the constraints on the control method.

Modified Example 5

Figure 16:
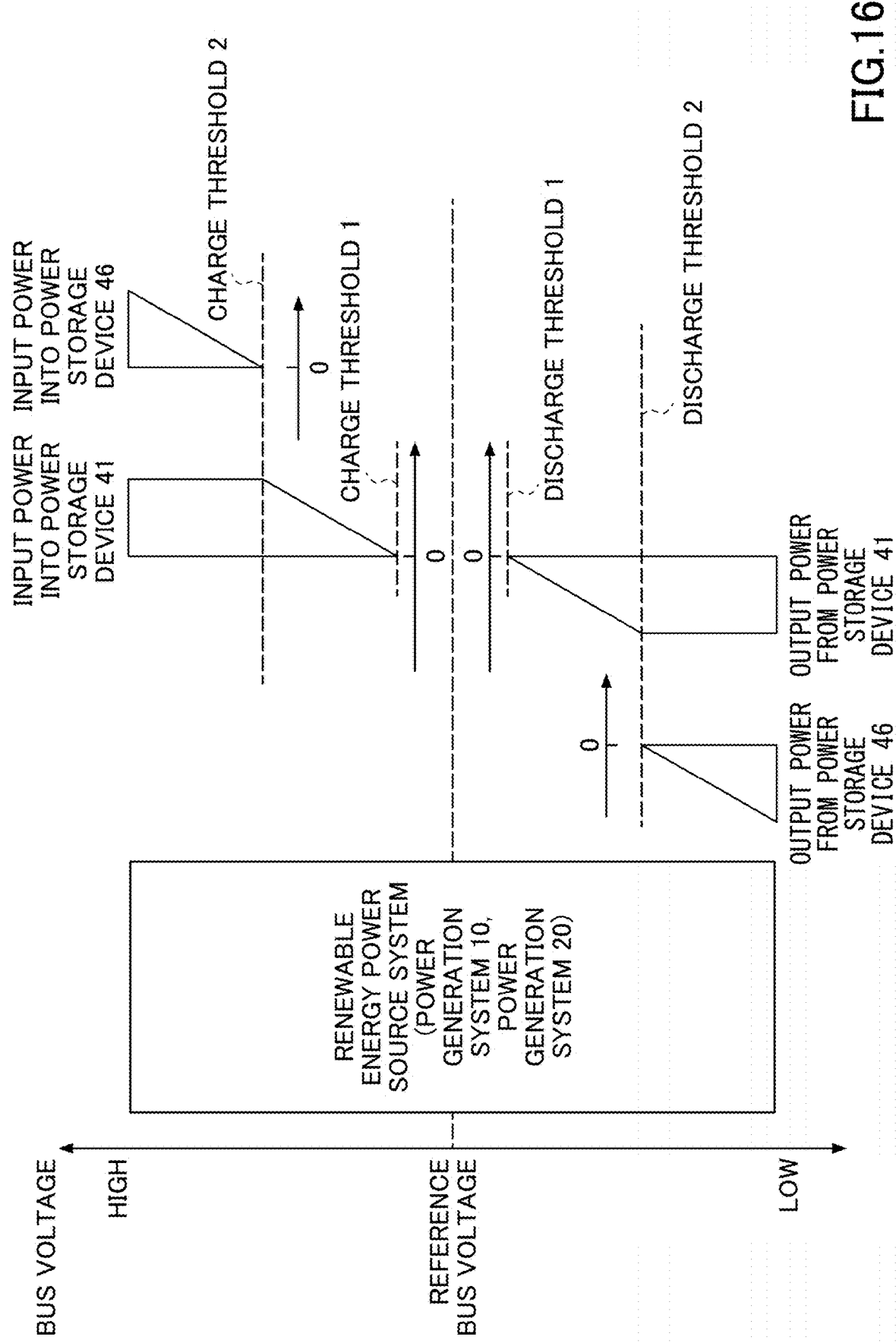
FIG. 16 is a diagram illustrating the operation of the DC bus control system according to the present embodiment.

In the foregoing description, the sub-stabilizer 50, the sub-stabilizer 55, the sub-stabilizer 60, and the sub-stabilizer 65 of the DC bus control system 1 according to the present embodiment have been described. The sub-stabilizer 40 and the sub-stabilizer 45 may be operated in the same manner. For example, regarding the sub-stabilizer 40 and the sub-stabilizer 45, it is possible to control the sub-stabilizer 40 and the sub-stabilizer 45 by using a charge threshold 1 and a discharge threshold 1 for the sub-stabilizer 40, and using a charge threshold 2 and a discharge threshold 2 for the sub-stabilizer 45. FIG. 16 is a diagram illustrating the modified example 5 of the operation of the DC bus control system 1 according to the present embodiment.

As illustrated in FIG. 16, the charge threshold 1 for the power storage device 41 of the sub-stabilizer 40 is lower than the charge threshold 2 for the power storage device 46 of the sub-stabilizer 45. The discharge threshold 1 for the power storage device 41 of the sub-stabilizer 40 is higher than the discharge threshold 2 for the power storage device 46 of the sub-stabilizer 45.

Regarding the power storage device 41, when the bus voltage increases from the reference bus voltage to become equal to or higher than the charge threshold 1, power (input power) is supplied from the DC/DC converter 42A of the power converter 42 into the power storage device 41. The power (input power) from the DC/DC converter 42A of the power converter 42 into the power storage device 41 is higher as the bus voltage is higher. When the bus voltage becomes equal to or higher than the charge threshold 2, the power (input power) from the DC/DC converter 42A of the power converter 42 into the power storage device 41 becomes constant.

Regarding the power storage device 46, when the bus voltage further increases from the reference bus voltage to become equal to or higher than the charge threshold 2, power (input power) is supplied from the DC/DC converter of the power converter 47 into the power storage device 46. The power (input power) from the DC/DC converter of the power converter 47 into the power storage device 46 is higher as the bus voltage is higher.

When the bus voltage is between the charge threshold 1 and the charge threshold 2, power is supplied into the power storage device 41 from the DC bus 70, but no power is supplied into the power storage device 46.

Regarding the power storage device 41, when the bus voltage decreases from the reference bus voltage to become equal to or lower than the discharge threshold 1, power (output power) is supplied from the power storage device 41 to the DC/DC converter of the power converter 42. The power (output power) from the power storage device 41 to the DC/DC converter of the power converter 42 is higher as the bus voltage is lower. When the bus voltage becomes equal to or lower than the discharge threshold 2, the power (output power) from the power storage device 41 to the DC/DC converter of the power converter 42 becomes constant.

Regarding the power storage device 46, when the bus voltage decreases from the reference bus voltage to become equal to or lower than the discharge threshold 2, power (output power) is supplied from the power storage device 46 to the DC/DC converter of the power converter 47. The power (output power) from the power storage device 46 to the DC/DC converter of the power converter 47 is higher as the bus voltage is lower.

When the bus voltage is between the discharge threshold 1 and the discharge threshold 2, power is supplied from the power storage device 41 to the DC bus 70, but no power is supplied from the power storage device 46.

The modified examples set forth above may be combined appropriately.

The power storage device 31 is an example of the first charge/discharge element, and the power converter 32 is an example of the first power converter. One selected from the sub-stabilizer 40, the sub-stabilizer 50, and the sub-stabilizer 60 is an example of the first sub-stabilizer, and the corresponding one selected from the sub-stabilizer 45, the sub-stabilizer 55, and the sub-stabilizer 65 is an example of the second sub-stabilizer. The power storage device 41 and the power storage device 46 are examples of the second charge/discharge element, the water electrolysis cell 51 and the water electrolysis cell 56 are examples of the charge element, and the fuel cell 61 and the fuel cell 66 are examples of the discharge element. The power converter 42, the power converter 52, the power converter 62, the power converter 47, the power converter 57, and the power converter 67 are examples of the second power converter. The charge threshold 1 is an example of the first charge threshold, the charge threshold 2 is an example of the second charge threshold, the discharge threshold 1 is an example of the first discharge threshold, and the discharge threshold 2 is an example of the second discharge threshold.

<Stability of the DC Bus Control System 1>

The stability of the DC bus control system 1 according to the present embodiment will be described below. In the following description, the main stabilizer 30 and the auxiliary device 35 are collectively referred to as the main stabilizers (Main Voltage Controllers (MVC)), the sub-stabilizer 40, the sub-stabilizer 45, the sub-stabilizer 50, the sub-stabilizer 55, the sub-stabilizer 60, and the sub-stabilizer 65 are collectively referred to as the sub-stabilizers (Sub Voltage Controllers (SVC)).

[Main Stabilizer]

The main stabilizer controls the bus voltage $V_B$. The bus voltage $V_B$ is determined by the main stabilizer in accordance with Equation 1. That is, the DC/DC converter of the main stabilizer is a bidirectional converter with a constant voltage output.

$$V_B = \frac{1}{C_{MVC}} \int_0^t I_{MVC} dt + V_{B0} = \frac{Q_{MVC}}{C_{MVC}} + V_{B0} \qquad \text{Equation 1}$$

$C_{MVC}$ represents the capacity of the power storage device of the main stabilizer, $I_{MVC}$ represents the current flowing through the power storage device of the main stabilizer (a charge current is assumed to be positive), $V_{B0}$ represents a bias voltage, and $Q_{MVC}$ represents the quantity of charges charged in the power storage device of the main stabilizer.

When the maximum suppliable/absorbable power is to be exceeded, the main stabilizer shifts to constant current control at the maximum suppliable/absorbable power of the power storage device, even while aiming at the above-defined $V_B$ as the control target voltage. In the constant current control, since all devices, including the sub-stabilizers, are in constant current mode, the bus voltage is automatically determined such that the sub-stabilizers absorb or discharge any surplus or deficit. Therefore, the bus voltage is controlled to be $V_B$, and the maximum suppliable power is supplied from the main stabilizer in the constant current mode. That is, the DC bus control system 1 can control power exceeding the power that can be handled by the main stabilizer. However, when power exceeding the power that can be handled by the main stabilizer is supplied, the quantity of charges charged in the power storage device of the main stabilizer has a large absolute value and falls out of the stable control range of a typical sub-stabilizer.

As described above, the DC bus control system 1 does not stop even when there is a power input/output that exceeds the handling capacity of the main stabilizer. However, the DC bus control system 1 does not respond to this in the normal linear responding manner. Moreover, the time for the DC bus control system 1 to recover is the time taken to discharge and absorb charges integrated for this time. The recovery time is approximately as long as the overload time.

The DC bus control system 1 can realize as quick a recovery to the linear control as possible upon disappearance of the overload condition, by restricting $Q_{MVC}$ of Equation 1 such that the absolute value of $Q_{MVC}$ falls within the linear control range or becomes a value slightly larger than the linear control range. However, even if the DC bus control system 1 recovers to the linear control, the physical $Q_{MVC}$ will be offset. That is, the charge rate of the power storage device will be offset.

[Sub-Stabilizer]

A sub-stabilizer generates or absorbs a current (or may be defined by power) that is determined by the bus voltage. A sub-stabilizer has an interface to a constant-current source and to a constant-current load in order for power to be input thereinto or output therefrom regardless of the value of the bus voltage $V_B$. The current $I_{SVC}$ to be generated or absorbed is typically expressed as Equation 2.

$$I_{SVC} = I_{SVC}(V_B) \qquad \text{Equation 2}$$

Among sub-stabilizers, a bidirectional device capable of generation and absorption, a device only capable of generation, and a device only capable of absorption can be expressed as differences in the function system of the function $I_{SVC}(\ )$. Here, the direction from the DC bus, in which the sub-stabilizer absorbs power, is indicated by the positive sign. The definition of the sign may be reversed.

For example, a device only capable of absorption is expressed by the following expressions.

$$I_{SVC} = a(V_B - b); \quad a, b > 0, V_B - b > 0$$

$$I_{SVC} = 0; \quad V_B - b > 0$$

For example, a device only capable of generation is expressed by the following expressions.

$$I_{SVC} = -a(V_B - b); \quad a, b > 0, V_B - b > 0$$

$$I_{SVC} = 0; \quad V_B - b < 0$$

In the above example, "a" has the conductance dimension. Also, in a case where control is based on power, similar formulation can be achieved by change in the dimension of the coefficient.

[External Devices]

External devices such as a power-consuming device and a power generation device are connected to the DC bus as the current mode (for example, as a constant-current source). The total current consumption Text of the external devices is expressed by Equation 3. Power consumption is indicated by the positive sign.

$$I_{ext} = I_{ext}(t) \qquad \text{Equation 3}$$

[Control Characteristics]

Considering the conversion efficiency and the bias current, the current $I_{MVC}$ in Equation 1 may be the actual charge/discharge current of the power storage device or may be the current on the DC bus side. Here, the current $I_{MVC}$ is assumed to be the current of the power storage device. The power balance on the DC bus is expressed by Equation 4. B represents an offset current.

$$kI_{MVC} + I_{SVC} + I_{ext} + B = 0 \qquad \text{Equation 4}$$

From Equations 1 and 2, the following relationship can be obtained.

$$\frac{dV_B}{dt} = \frac{I_{MVC}}{C_{MVC}}$$

$$\frac{dI_{SVC}}{dt} = \frac{\partial I_{SVC}}{\partial V_B} \frac{dV_B}{dt}$$

Therefore, using the above relationship, the following relationship can be derived.

$$kC_{MVC} \frac{d^2 V_B}{dt^2} + \frac{\partial I_{SVC}}{\partial V_B} \frac{dV_B}{dt} + \frac{dI_{ext}}{dt} = 0$$

Here, if the power consumption of the external devices is constant, the following relationship will be exhibited.

$$\frac{dI_{ext}}{dt} = 0$$

Therefore, as shown in Equation 5, the DC bus control system 1 exhibits the response of the primary delay system.

$$\frac{kC_{MVC}}{\frac{\partial I_{SVC}}{\partial V_B}} \frac{dV_B}{dt} + V_B - V_0 = 0 \qquad \text{Equation 5}$$

$$V_B = V_0 + \exp\left(-t \Big/ \frac{kC_{MVC}}{\frac{\partial I_{SVC}}{\partial V_B}}\right)$$

When the external power consumption is constant, the bus voltage converges to a constant value at a predetermined time constant. At this time, the $I_{MVC}$ becomes zero. Therefore, the DC bus control system 1 according to the present embodiment can operate stably without oscillation.

Even in a case of not taking measures against overloading, charging efficiency control is at least necessary, in order to enable a long-time operation. The efficiency of the power storage device used in the main stabilizer is finite, and it is impossible to estimate the efficiency accurately. The efficiency varies depending on the temperature of the device and various parameters. Moreover, in the control, the power storage device is continuously charged or discharged. Even if a calculated $Q_{MVC}$ is constant in the control, it may be deviated from the $Q_{MVC}$ of the actual device, and the power storage device may be depleted or saturated in a relatively short time.

The charging efficiency of the power storage device can be estimated from the terminal voltage. However, since the terminal voltage depends on the charge/discharge current, it is necessary to measure the terminal voltage by bringing the charge/discharge current to be zero. By utilizing a nature that the charge/discharge current being zero is automatically achieved when the external devices are stable, it is possible to incorporate the charging efficiency control by using the following equation.

$$V_B = \frac{1}{C_{MVC}} \left\{ \int_0^t I_{MVC} dt - \frac{1}{T_{SoC}} \int_{|I_{MVC}| < I_{th}} (V_{SoC} - V_T) dt \right\} + V_{B0}$$

Note that $V_{SoC}$ represents the terminal voltage of the power storage device, and $V_T$ represents the control target value of the terminal voltage of the power storage device. The integration of the second term is meant to be performed only when the absolute value of $I_{MVC}$ is smaller than a threshold $I_{th}$. The threshold $I_{th}$ is a threshold current value that is set as an empirical value. Practically, the above equation is calculated and controlled by discretization.

Moreover, in addition to the above-described operating method of leveling the operations of the plurality of sub-stabilizers, an operating method of taking into consideration the reaction responsiveness, the charging capacity, and the like of each sub-stabilizer and prioritizing the charge power and the discharge power is also conceivable. For example, some sub-stabilizers may be operated in a state close to a fully charged state, while other sub-stabilizers may be operated in a state of being almost completely discharged.

Although the present invention has been described based on the above embodiments, the present invention is not limited to the above embodiments, and various modifications are applicable within the scope of the claims.

What is claimed is:

1. A direct-current bus control system for controlling power variation in a DC bus connecting an input power source and a load, the direct-current bus control system comprising:
   a main stabilizer including a first charge/discharge element and a first power converter; and
   a plurality of sub-stabilizers each including a second charge/discharge element, a charge element, or a discharge element, and a second power converter,
   wherein the first power converter is configured to obtain a bus voltage target value corresponding to a power storage quantity index of the first charge/discharge element, and to cause the first charge/discharge element and the DC bus to bidirectionally transmit or receive a DC power to or from each other such that a voltage of the DC bus becomes equal to the bus voltage target value,
   the second power converter is configured to obtain a current target value in accordance with a difference between the voltage of the DC bus and a threshold regarding charging or discharging of the second charge/discharge element, the charge element, or the discharge element, and to cause the second charge/discharge element, the charge element, or the discharge element and the DC bus to transmit or receive a DC power to or from each other such that a current equal to the current target value flows through the second charge/discharge element, the charge element, or the discharge element,
   the plurality of sub-stabilizers include a first sub-stabilizer and a second sub-stabilizer including the charge element,
   the second power converter of the first sub-stabilizer is configured to supply the current equal to the current target value obtained by the second power converter of the first sub-stabilizer from the DC bus to the charge element of the first metal-stabilizer when the voltage of the DC bus is higher than a first charge threshold, and
   the second power converter of the second sub-stabilizer is configured to stop supplying a current from the DC bus to the charge element of the second sub-stabilizer or to supply a constant current from the DC bus to the charge element of the second sub-stabilizer regardless of the voltage of the DC bus when the voltage of the DC bus is higher than the first charge threshold and lower than a second charge threshold that is higher than the first charge threshold, and to supply the current equal to the current target value obtained by the second power converter of the second sub-stabilizer from the DC bus to the charge element of the second sub-stabilizer when the voltage of the DC bus is higher than the second charge threshold.

2. The direct-current bus control system according to claim 1,
   wherein when the voltage of the DC bus is higher than the second charge threshold, the second power converter of the first sub-stabilizer supplies a constant current from the DC bus to the charge element of the first sub-stabilizer regardless of the voltage of the DC bus.

3. The direct-current bus control system according to claim 1,
   wherein the charge element of each of the first sub-stabilizer and the second sub-stabilizers is a water electrolysis cell.

4. The direct-current bus control system according to claim 1, further comprising:
   a renewable energy power source system as the input power source.

5. The direct-current bus control system according to claim 1, further comprising:
   the load.

6. A direct-current bus control system for controlling power variation in a DC bus connecting an input power source and a load, the direct-current bus control system comprising:
   a main stabilizer including a first charge/discharge element and a first power converter; and
   a plurality of sub-stabilizers each including a second charge/discharge element, a charge element, or a discharge element, and a second power converter,
   wherein the first power converter is configured to obtain a bus voltage target value corresponding to a power storage quantity index of the first charge/discharge element, and to cause the first charge/discharge element and the DC bus to bidirectionally transmit or receive a DC power to or from each other such that a voltage of the DC bus becomes equal to the bus voltage target value,
   the second power converter is configured to obtain a current target value in accordance with a difference between the voltage of the DC bus and a threshold regarding charging or discharging of the second charge/discharge element, the charge element, or the discharge element, and to cause the second charge/discharge element, the charge element, or the discharge element and the DC bus to transmit or receive a DC power to or from each other such that a current equal to the current target value flows through the second charge/discharge element, the charge element, or the discharge element,
   the plurality of sub-stabilizers include a first sub-stabilizer and a second sub-stabilizer including the discharge element,
   the second power converter of the first sub-stabilizer is configured to supply the current equal to the current target value obtained by the second power converter of the first sub-stabilizer to the DC bus from the discharge element of the first sub-stabilizer when the voltage of the DC bus is lower than a first discharge threshold, and
   the second power converter of the second sub-stabilizer is configured to stop supplying a current to the DC bus from the discharge element of the second sub-stabilizer or to supply a constant current to the DC bus from the discharge element of the second sub-stabilizer regardless of the voltage of the DC bus when the voltage of the DC bus is lower than the first discharge threshold and higher than a second discharge threshold that is lower than the first discharge threshold, and to supply the current equal to the current target value obtained by the second power converter of the second sub-stabilizer to the DC bus from the discharge element of the second sub-stabilizer when the voltage of the DC bus is lower than the second discharge threshold.

7. The direct-current bus control system according to claim 6,
   wherein when the voltage of the DC bus is lower than the second discharge threshold, the second power converter of the first sub-stabilizer supplies a constant current to the DC bus from the discharge element of the first sub-stabilizer regardless of the voltage of the DC bus.

8. The direct-current bus control system according to claim 6,
wherein the discharge element of each of the first sub-stabilizer and the second sub-stabilizers is a fuel cell.

9. A direct-current bus control system for controlling power variation in a DC bus connecting an input power source and a load, the direct-current bus control system comprising:
a main stabilizer including a first charge/discharge element and a first power converter; and
a plurality of sub-stabilizers each including a second charge/discharge element, a charge element, or a discharge element, and a second power converter,
wherein the first power converter is configured to obtain a bus voltage target value corresponding to a power storage quantity index of the first charge/discharge element, and to cause the first charge/discharge element and the DC bus to bidirectionally transmit or receive a DC power to or from each other such that a voltage of the DC bus becomes equal to the bus voltage target value,
the second power converter is configured to obtain a current target value in accordance with a difference between the voltage of the DC bus and a threshold regarding charging or discharging of the second charge/discharge element, the charge element, or the discharge element, and to cause the second charge/discharge element, the charge element, or the discharge element and the DC bus to transmit or receive a DC power to or from each other such that a current equal to the current target value flows through the second charge/discharge element, the charge element, or the discharge element,
the plurality of sub-stabilizers include a first sub-stabilizer and a second sub-stabilizer including the second charge/discharge element,
the second power converter of the first sub-stabilizer is configured to supply the current equal to the current target value obtained by the second power converter of the first sub-stabilizer from the DC bus to the second charge/discharge element of the first sub-stabilizer when the voltage of the DC bus is higher than a first charge threshold,
the second power converter of the second sub-stabilizer is configured to stop supplying a current from the DC bus to the second charge/discharge element of the second sub-stabilizer or to supply a constant current from the DC bus to the second charge/discharge element of the second sub-stabilizer regardless of the voltage of the DC bus when the voltage of the DC bus is higher than the first charge threshold and lower than a second charge threshold that is higher than the first charge threshold, and to supply the current equal to the current target value obtained by the second power converter of the second sub-stabilizer from the DC bus to the second charge/discharge element of the second sub-stabilizer when the voltage of the DC bus is higher than the second charge threshold,
the second power converter of the first sub-stabilizer is configured to supply the current equal to the current target value obtained by the second power converter of the first sub-stabilizer from the second charge/discharge element of the first sub-stabilizer to the DC bus when the voltage of the DC bus is lower than a first discharge threshold, and
the second power converter of the second sub-stabilizer is configured to stop supplying a current from the second charge/discharge element of the second sub-stabilizer to the DC bus or to supply a constant current from the second charge/discharge element of the second sub-stabilizer to the DC bus regardless of the voltage of the DC bus when the voltage of the DC bus is lower than the first discharge threshold and higher than a second discharge threshold that is lower than the first discharge threshold, and to supply the current equal to the current target value obtained by the second power converter of the second sub-stabilizer from the second charge/discharge element of the second sub-stabilizer to the DC bus when the voltage of the DC bus is lower than the second discharge threshold.

10. The direct-current bus control system according to claim 9,
wherein when the voltage of the DC bus is higher than the second charge threshold, the second power converter of the first sub-stabilizer supplies a constant current from the DC bus to the second charge/discharge element of the first sub-stabilizer regardless of the voltage of the DC bus, and
when the voltage of the DC bus is lower than the second discharge threshold, the second power converter of the first sub-stabilizer supplies a constant current from the second charge/discharge element of the second sub-stabilizer to the DC bus regardless of the voltage of the DC bus.

* * * * *